(12) United States Patent
Agnew

(10) Patent No.: US 9,562,381 B2
(45) Date of Patent: *Feb. 7, 2017

(54) VEHICLE WINDOW ASSEMBLY

(71) Applicant: Nissan North America, Inc., Franklin, TN (US)

(72) Inventor: David Agnew, Clarkston, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,909

(22) Filed: Aug. 27, 2015

(65) Prior Publication Data

US 2016/0281402 A1 Sep. 29, 2016

Related U.S. Application Data

(63) Continuation-in-part of application No. 14/671,861, filed on Mar. 27, 2015.

(51) Int. Cl.
*B60J 5/06* (2006.01)
*E05D 5/02* (2006.01)
*B60J 1/20* (2006.01)
*E05D 11/00* (2006.01)

(52) U.S. Cl.
CPC ............ *E05D 5/0207* (2013.01); *B60J 1/2094* (2013.01); *E05D 11/0054* (2013.01)

(58) Field of Classification Search
CPC ............... B60J 1/2094; B60J 1/16; B60J 5/06; E05D 5/0207; E05D 11/0054
USPC .. 296/95.1, 146.15, 146.16; 280/748; 49/50, 56, 57; 16/90, 92, 235, 239, 250
See application file for complete search history.

(56) References Cited

U.S. PATENT DOCUMENTS

| 2,864,648 | A | * | 12/1958 | Bland | B60J 1/20 280/748 |
| 4,653,562 | A | * | 3/1987 | Moss | B60J 1/20 160/105 |
| 5,810,412 | A | * | 9/1998 | Hall | B60P 3/04 296/24.31 |
| 5,954,384 | A | * | 9/1999 | Jones | B60J 1/2011 280/748 |
| 2004/0040230 | A1 | * | 3/2004 | Taegar | E06B 9/04 52/202 |

* cited by examiner

*Primary Examiner* — Joseph D Pape
(74) *Attorney, Agent, or Firm* — Global IP Counselors, LLP

(57) ABSTRACT

A vehicle window assembly includes a body structure, a hinge structure, and a covering panel. The covering panel overlies an inboard side of a window opening, and comprises a hanging loop with a hanging section. The hinge structure comprises a hinge base and a hinge cover, and is attached to the upper portion of the body structure. The hinge cover attaches to the hinge base to form a loop support portion between the hinge base and the hinge cover, and to enclose a hanging loop, preventing removal of the hanging loop. The loop support portion enables the hanging loop to be movable between a secured position in which the hanging section is positioned adjacent the inboard end of the hinge base, and an unsecured position in which the hanging section is disposed adjacent the outboard end of the hinge base.

20 Claims, 19 Drawing Sheets

VEHICLE WINDOW ASSEMBLY

CROSS-REFERENCE TO RELATED APPLICATIONS

This application is a continuation-in-part of U.S. patent application Ser. No. 14/671,861, filed Mar. 27, 2015, entitled VEHICLE WINDOW ASSEMBLY, the contents of which are hereby incorporated herein by reference.

BACKGROUND

Field of the Invention

The present invention generally relates to a vehicle window assembly. More specifically, the present invention relates to a vehicle window assembly that prevents objects from passing through a vehicle window opening.

Background Information

To restrict objects passing through windows in vehicles, side curtain airbags have been used. Additionally, some vehicles have included window glazing. Each of these methods has had some success in restricting objects passing through windows in vehicles.

SUMMARY

It has been discovered that to improve the restriction of objects passing through windows, a covering panel of a vehicle window assembly can be disposed so as to overlie a window opening. In view of the state of the known technology, one aspect of the present invention includes a vehicle window assembly comprising a body structure, a hinge structure and a covering panel. The body structure defines a window opening, and has an upper portion extending along an upper edge of the window opening. The covering panel overlies an inboard side of the window opening, and comprises a hanging loop with a hanging section. The hinge structure comprises a hinge base and a hinge cover, the hinge base including an inboard end and an outboard end, and being attached to the upper portion of the body structure at the inboard end. The hinge cover is configured to attach to the hinge base so as to form a loop support portion between the hinge base and the hinge cover, and so as to enclose an area in which the hanging loop is to be disposed, preventing removal of the hanging loop from the area. The loop support portion is configured to enable the hanging loop to be movable between a secured position in which the hanging section of the hanging loop is positioned adjacent the inboard end of the hinge base, and an unsecured position in which the hanging section of the hanging loop is disposed adjacent the outboard end of the hinge base.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
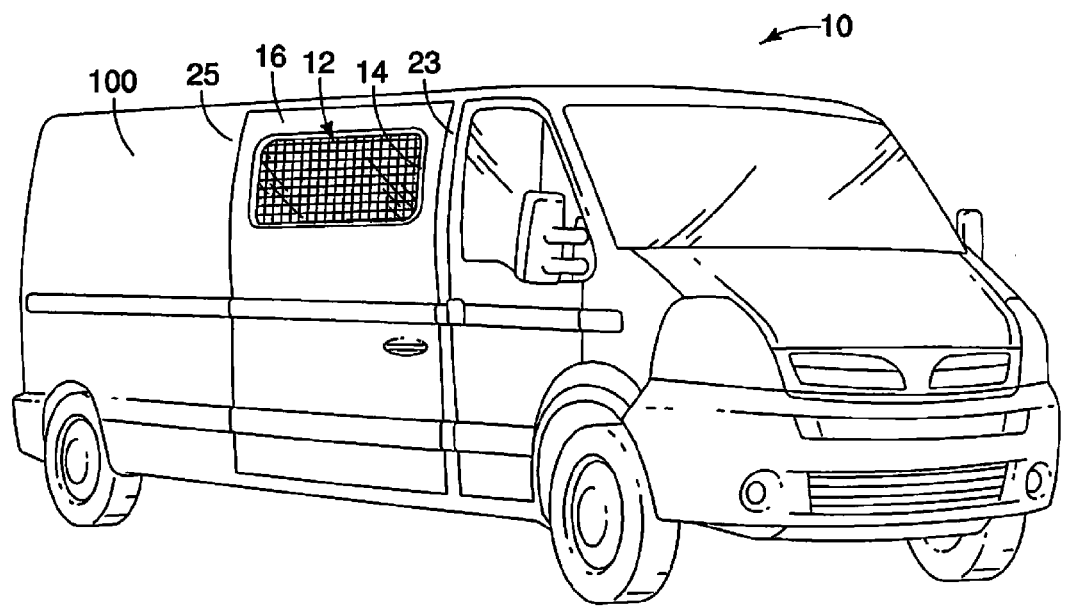
FIG. 1 is a perspective view of a vehicle with a vehicle window assembly according to one embodiment of the present invention.
Figure 2:
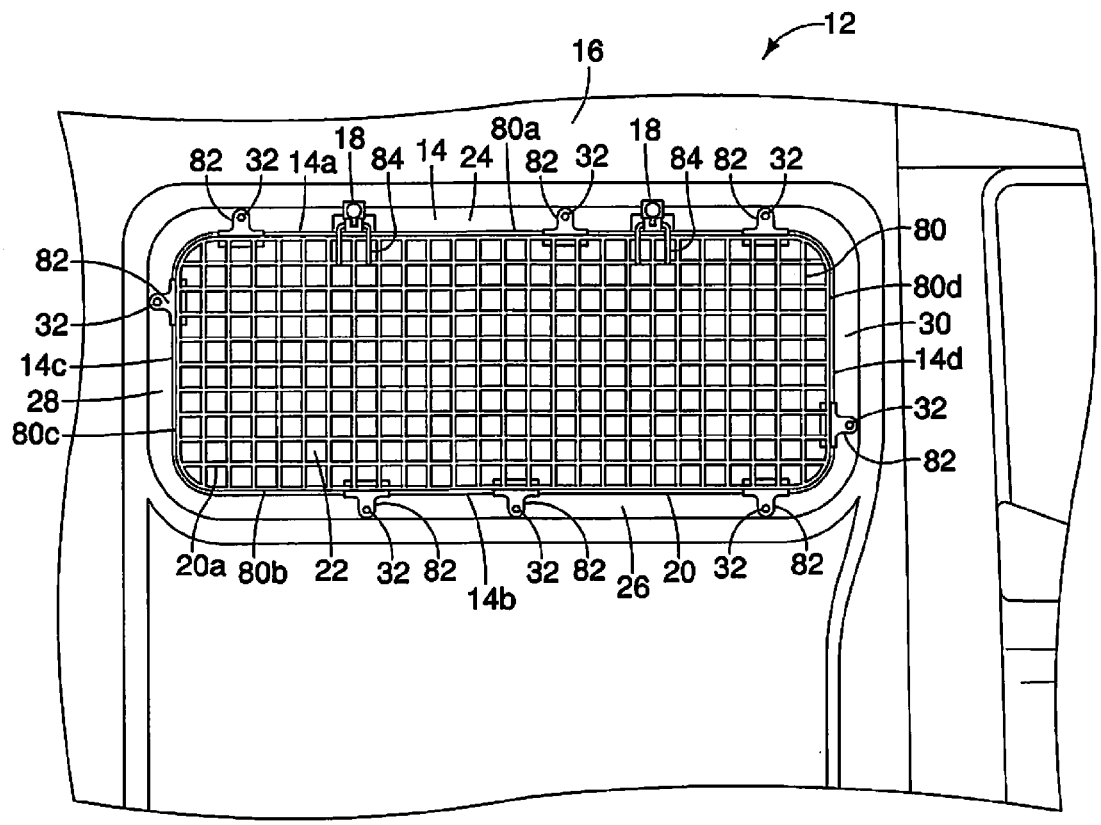
FIG. 2 illustrates a vehicle window assembly according to one embodiment with the covering panel attached to the body structure.
Figure 3:
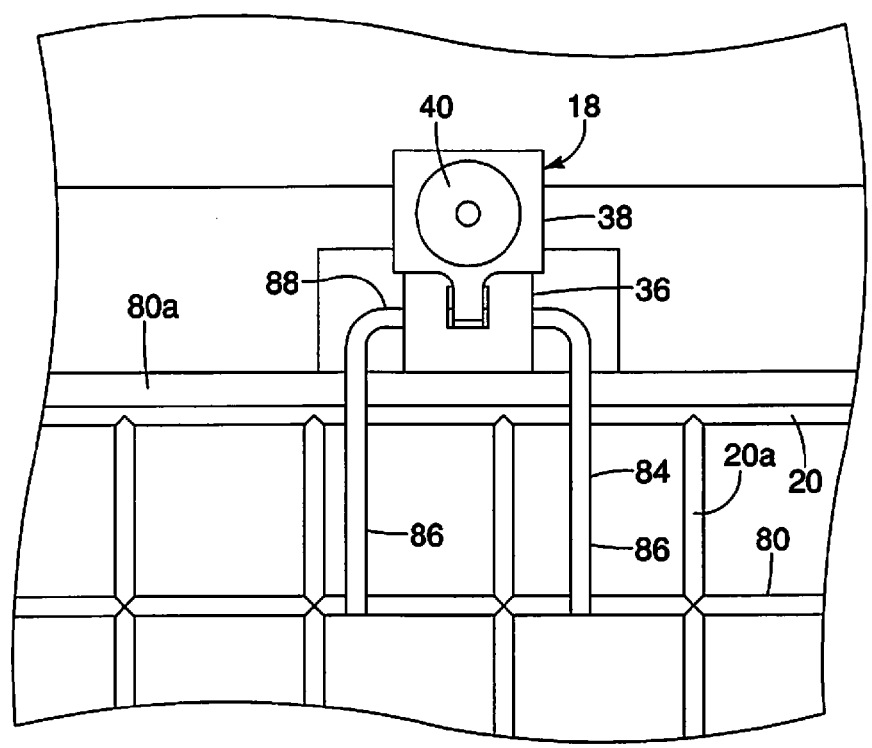
FIG. 3 illustrates an enlarged front view of a hinge structure in the vehicle window assembly shown in FIG. 2.
Figure 4:
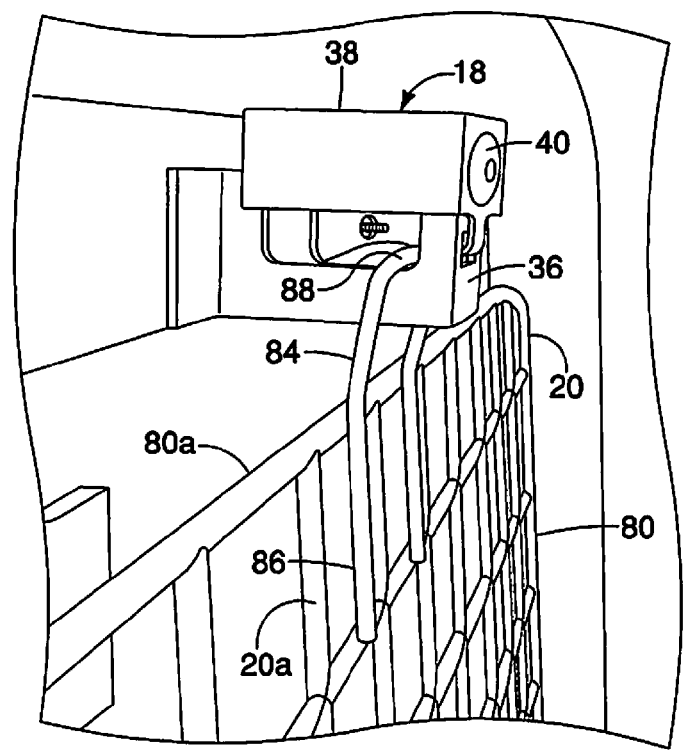
FIG. 4 illustrates a side perspective view of the hinge structure in the vehicle window assembly shown in FIG. 3, with the covering panel in an unsecured position.
Figure 5:
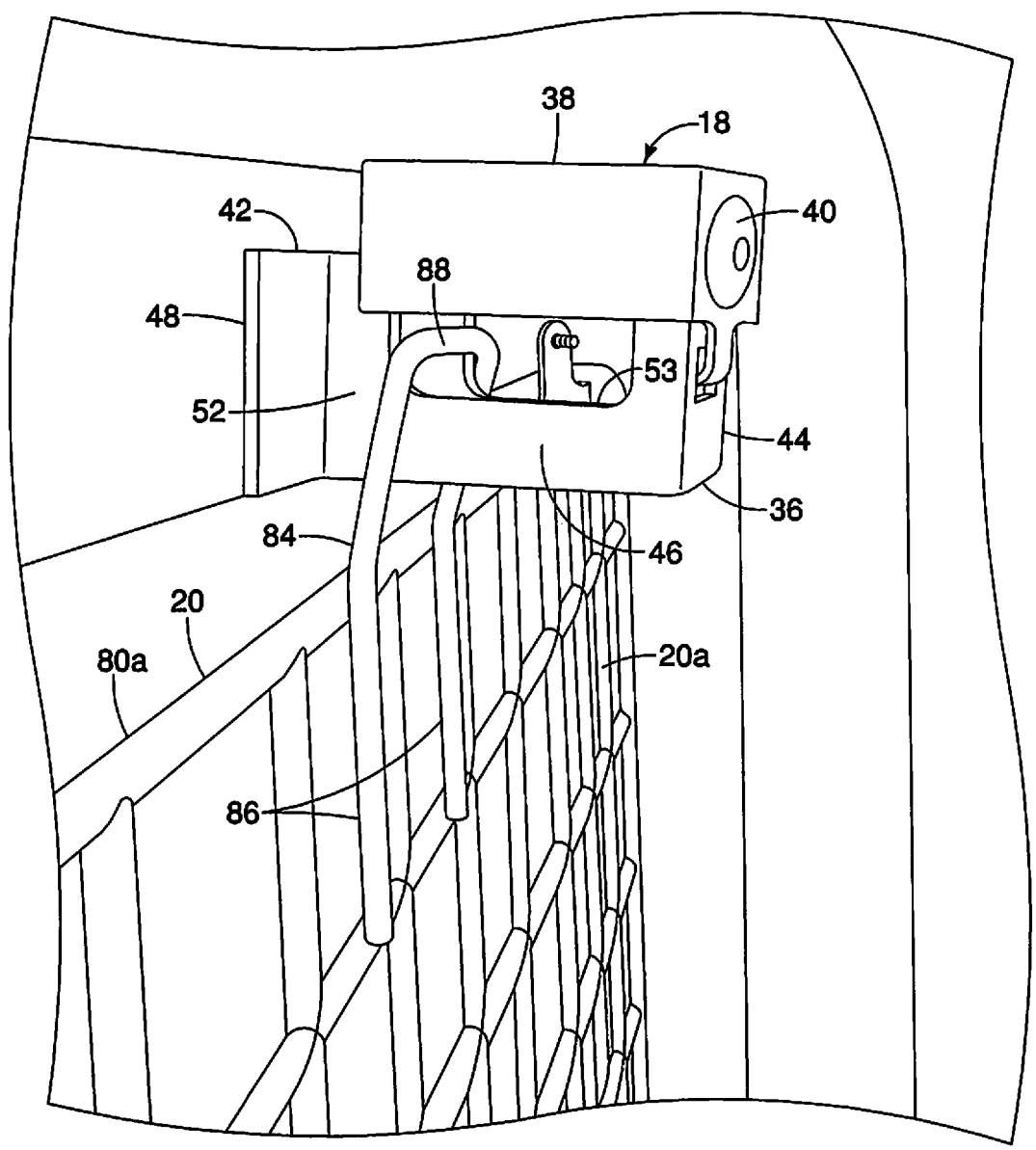
FIG. 5 illustrates a side perspective view of the hinge structure in the vehicle window assembly shown in FIG. 3, with the covering panel in the secured position.
Figure 6:
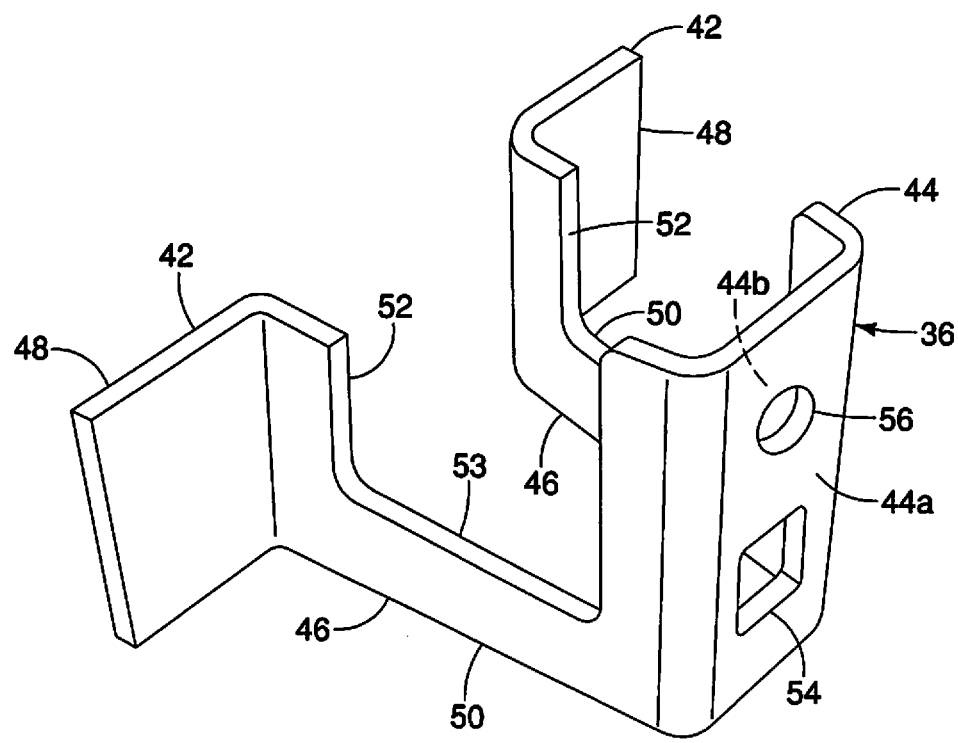
FIG. 6 is a top perspective view of the hinge base of the hinge structure shown in FIG. 3.

Referring initially to FIGS. 1 and 2, a vehicle window assembly 12 is illustrated in accordance with a first embodiment. The vehicle window assembly 12 can be disposed so as to overlie the interior side of a window opening 14 in a door a vehicle 10 (e.g. a cargo van). The vehicle window assembly 12 comprising a body structure 16, at least one hinge structure 18 and a covering panel 20. The vehicle window assembly 12 restricts objects from passing through the vehicle window opening 14 to maintain objects within the vehicle 10. Moreover, based on the vehicle window assembly 12 structure, at least a portion of the covering panel 20 can be moved relative to the window opening 14 so as to enable a window 22 disposed in the window opening 14 to be cleaned.

Figure 10:
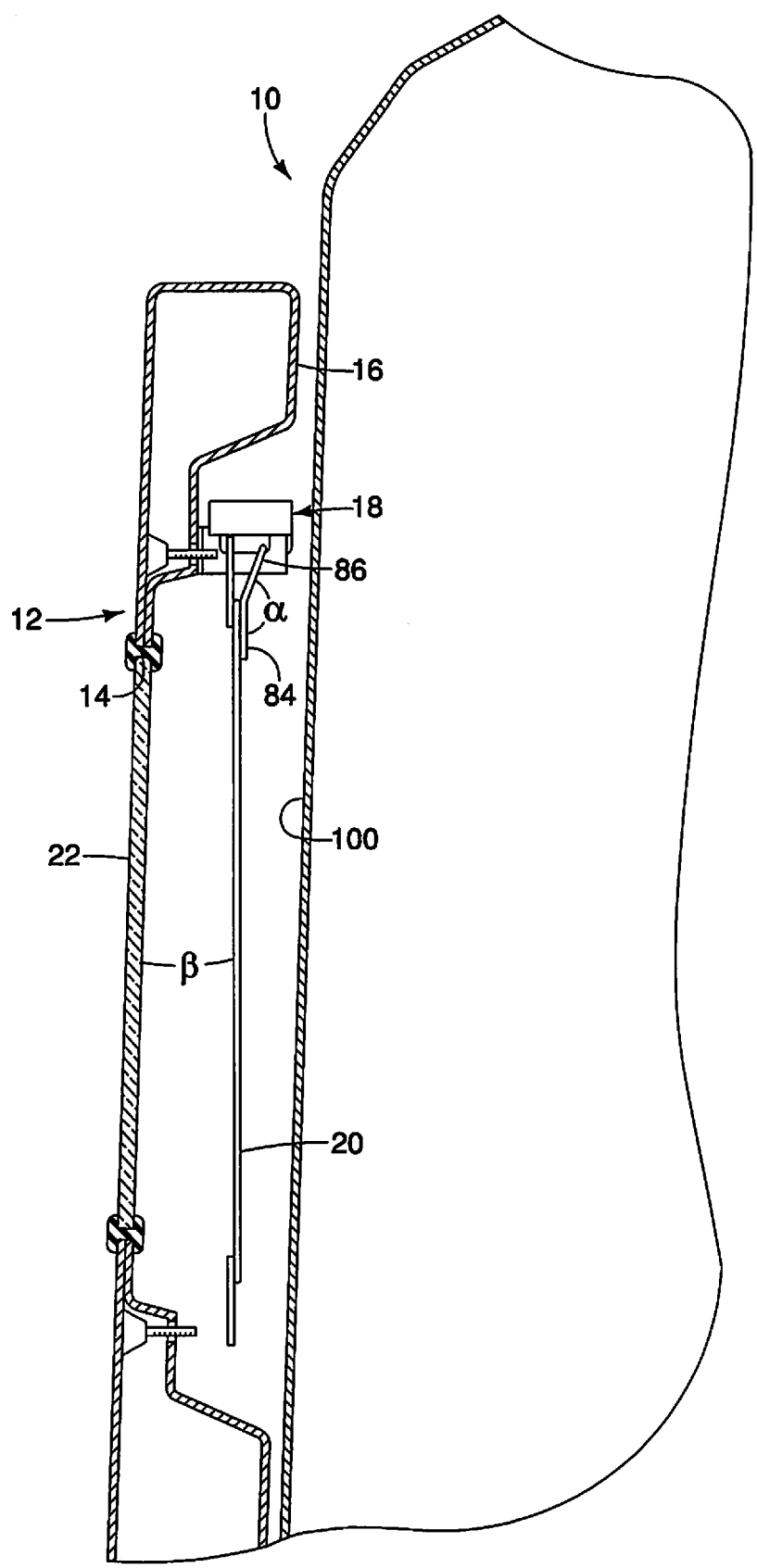
FIG. 10 is a side cross-sectional view of the body structure of FIG. 2, with the covering panel shown in an unsecured position and a vehicle sliding door in an open position.

The body structure 16 can be a vehicle door, such as a metal cargo van sliding door (FIG. 10). That is, in one embodiment, the body structure 16 is a sliding door movable from a closed position (FIG. 1) in which the sliding door is positioned between a forward pillar 23 and a rearward pillar 25, and an open position (FIG. 10) in which the sliding door is positioned outboard of the rearward pillar 25. Accordingly, the covering panel 20, when in the unsecured position, extends downward such that the covering panel 20 is positioned outboard of and free from contacting the rearward pillar 25 when the sliding door is moved to the open position however, the body structure 16 can be any suitable structure or material for a vehicle structure having a vehicle window opening 14. As shown in FIG. 2, the body structure 16 defines the window opening 14 that can have the window 22 disposed therein.

The body structure 16 has an upper portion 24 extending along an upper edge 14a of the window opening 14, a lower portion 26 extending along a lower edge 14b of the window opening 14, a first side portion 28 extending along a first side edge 14c of the window opening 14 and a second side portion 30 extending along a second side edge 14d of the window opening 14. In this embodiment, the upper portion 24 is generally parallel to the lower portion 26 and the first side portion 28 is generally parallel to the second side portion 30, so that the body structure 16 defines a rectangular window opening; however, the window opening 14 can be any suitable configuration.

Figure 8:
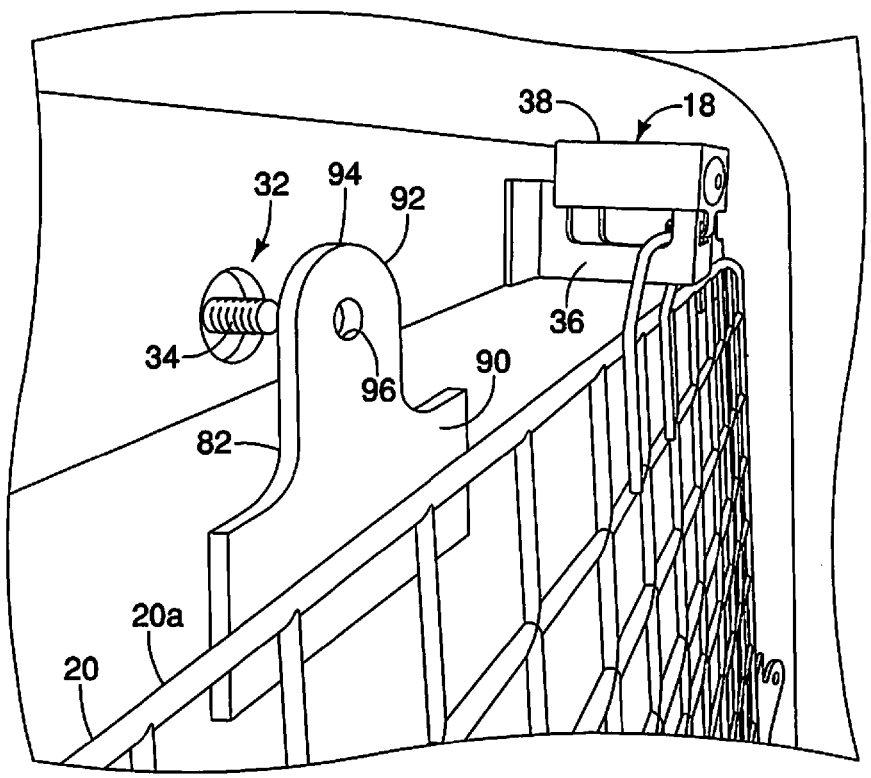
FIG. 8 is a side perspective view of the covering panel of the vehicle window assembly in an unsecured position.

As shown in FIGS. 2 and 8, the body structure 16 has a plurality of mounting studs 32 extending therefrom (e.g., eight (8) mounting studs as shown in FIG. 2). The mounting studs 32 preferably have a threaded shaft 34 extending from the body structure 16. In this embodiment, a mounting stud 32 is disposed along the first side portion 28. The mounting stud 32 disposed on the first side portion 28 is disposed so as to be near or adjacent the upper portion 24. A mounting stud 32 is disposed along the second side portion 30. A mounting stud 32 is disposed on the second side portion 30 near or adjacent the lower side portion. Three mounting studs 32 are disposed along the upper portion 24, with one mounting stud 32 disposed adjacent the first side portion 28, a mounting stud 32 disposed adjacent the second side portion 30 and a mounting stud 32 disposed between two mounting studs. Three mounting studs 32 are disposed along the lower portion 26, with a mounting stud 32 disposed adjacent the first side portion 28, a mounting stud 32 disposed adjacent the second side portion 30 and the mounting stud 32 disposed between two mounting studs 32. The position and number of mounting studs 32 illustrated herein is merely exemplary, and there can be any suitable number of mounting studs 32 disposed in any desired position.

As shown in FIG. 2, in one embodiment, the vehicle window assembly 12 includes two hinge structures 18. However, it is noted that the vehicle window assembly 12 can include any suitable number of hinge structures. Since each of the hinge structures 18 is substantially identical, only one hinge structure 18 will be described herein. As shown in FIGS. 3-6, the hinge structure 18 is a generally a U-shaped metal, unitary structure that includes a hinge base 36 and a hinge cover 38, which are coupled together with a fastener 40. The hinge base 36 includes an attachment portion 42, a cover mounting portion 44, and a loop support portion 46.

In one embodiment, the attachment portion 42 has two generally rectangular flanges 48 that are proximal to and rigidly attached to the upper portion 24 of the body structure 16. Accordingly, the two flanges 48 can extend away from each other in the same plane so as to facilitate rigid attachment to the body structure 16. However, the attachment portion 42 can be any suitable configuration, have any suitable number of flanges, and can be attached to the upper portion 24 of the body structure 16 in any suitable manner, such as welding or adhesive.

The loop support portion 46 generally includes two longitudinal sections 50 having opposed retention flanges 52 extending from the two flanges 48 of the attachment portion 42, respectively. The two longitudinal sections 50 are opposed to each other and can extend inboard from the flanges 48 in a generally perpendicular manner, or at any suitable angle. In this embodiment, the two longitudinal sections 50 extend from the flanges 48 at an angle of more than 90 degrees. Each of the two longitudinal sections 50 of the loop support portion 46 generally define a recessed portion 53. Thus, the recessed portion 53 of the loop support portion 46 has a height that is less than other portions of the hinge base 36.

The cover mounting portion 44 is attached to the loop support portion 46 such that the loop support portion 46 extends between the attachment portion 42 and the cover mounting portion 44. The cover mounting portion 44 extends generally upwardly and perpendicularly from the loop support portion 46. The cover mounting portion 44 includes a generally rectangular wall 44a and an outboard surface 44b that extend between the two longitudinal sections 50 of the loop support portion 46, and includes a tab aperture 54 and a fastener aperture 56. In this embodiment, the fastener aperture 56 and the tab aperture 54 are both disposed approximately along the center line of the cover mounting portion 44 with the fastener aperture 56 being disposed above the tab aperture 54. The tab aperture 54 is generally rectangular and the fastener aperture 56 is generally circular. However, each aperture can be any suitable shape or configuration.

Figure 7:
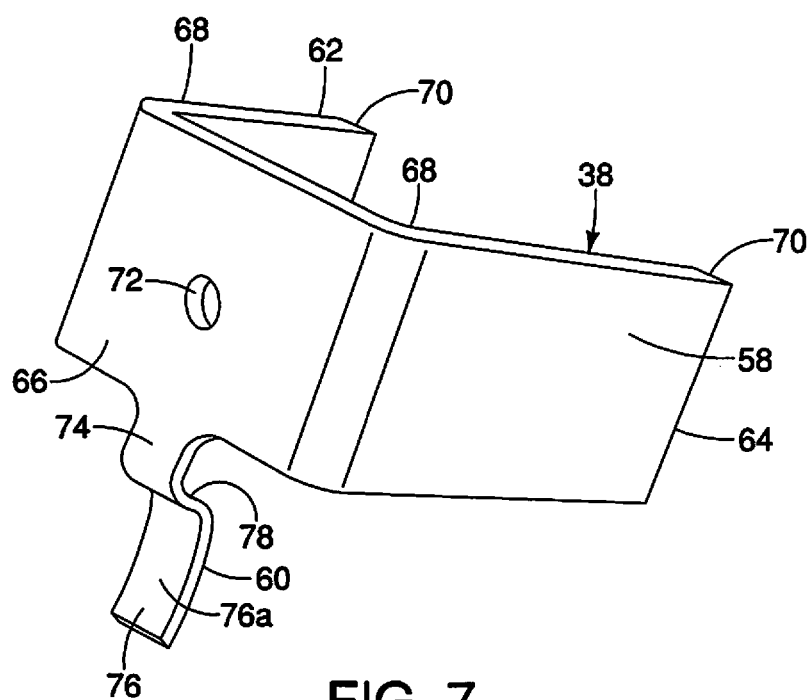
FIG. 7 is a front perspective view of a hinge cover of the hinge structure shown in FIG. 3.

As shown in FIGS. 3-5 and 7, the hinge cover 38 is generally a unitary, metal U-shaped structure and includes a cover portion 58 and a mounting tab 60. As shown in FIG. 7, the cover portion 58 is a generally U-shaped member with a first extension 62 (retention arm) a second extension 64 (retention arm) and a connecting wall 66 extending between the first and second extensions 62, 64. In other words, the hinge cover 38 includes two opposed retention arms. The first and second extensions 62, 64 extend from a proximal end 68 adjacent the connecting wall 66 to a distal end 70. The first and second extensions 62, 64 can be generally parallel or extend at any suitable angle relative to each other. For example, in one embodiment, the first and second extensions 62, 64 extend away from each other from the proximal ends 68 to the distal ends 70. The connecting wall 66 is generally rectangular, but can be any suitable shape, and has a generally circular fastener opening 72. The fastener opening 72 is preferably disposed along the center line of the cover portion 58 and is configured to align with the fastener aperture 56 of the hinge base 36.

The mounting tab 60 includes a base portion 74 extending downward from the connecting wall 66 and a retaining portion 76 with an engagement surface 76*a* extending downward and offset from the base portion 74. That is, as shown in FIG. 7, the mounting tab 60 extends downward from substantially the center of the connecting wall 66. An offset portion 78 extends rearwardly and about 90 degrees from the base portion 74 and the retaining portion 76 extends downwardly and about 90 degrees from the offset portion 78.

As shown in FIGS. 1-4, 8 and 9, the covering panel 20 is preferably metal and comprises a covering portion 80, a plurality of attachment brackets 82 and at least one hanging loop 84. The covering panel 20 is rectangular and is formed from a plurality of wires 20*a* that form a mesh grid pattern; however, it is noted that covering portion 80 can be formed in any suitable manner and in any suitable shape, so as to cover the window opening 14. The covering portion 80 has a top edge 80*a*, a bottom edge 80*b* and left and right side edges 80*c*, 80*d*.

The at least one hanging loop 84 in one embodiment is two hanging loops 84. The hanging loops 84 are attached or disposed at the top edge 80*a* of the covering portion 80. In this embodiment, the hanging loops 84 are welded to the covering portion 80 but can be attached in any suitable manner. The hanging loops 84 include upwardly extending sections 86 (connecting sections) and a hanging section 88 disposed between the upwardly extending sections 86. In this embodiment. The upwardly extending sections 86 are generally parallel and each extend substantially perpendicular to the hanging section 88. Preferably, the hanging loops 84 are attached to the covering portion 80 on the inboard side thereof.

As shown in FIG. 10, the upwardly extending sections 86 of the loop 84 portion have an angle α that enables the covering panel 20 to extend at an angle β to the plane of the window opening 14 when the covering panel 20 is not secured to the body structure 16 using the mounting studs 32. In one embodiment, the angle α in the upwardly extending sections 86 is an obtuse angle between about 135 degrees and less than 180 degrees.

The plurality of attachment brackets 82 is preferably about 8 attachment brackets 82 disposed or attached along the edges 80*a*-80*d* of the covering panel 20. In this embodiment, an attachment bracket 82 is disposed along the left edge 80*c*. The attachment bracket 82 disposed on the left edge 80*c* is disposed so as to be near or adjacent the top edge 80*a*. An attachment bracket 82 is disposed along the right edge 80*d*. The attachment bracket 82 disposed on the right edge 80*d* is disposed near or adjacent the bottom edge 80*b*. Three attachment brackets 82 are disposed along top edge 80*a*, with an attachment bracket 82 disposed adjacent the left edge 80*c*, an attachment bracket 82 disposed adjacent the right edge 80*d* and the attachment brackets 82 disposed between these two attachment brackets 82. Three attachment brackets 82 are disposed along the bottom edge 80*b*, with the attachment brackets 82 disposed adjacent the right edge 80*d*, and two attachment brackets 82 disposed generally in the center of the bottom edge 80*b*. The position and number of attachment brackets 82 illustrated herein is merely exemplary, and there can be any suitable number of attachment brackets 82 disposed in any desired position. Accordingly, as can be seen in FIG. 2, each of the attachment brackets 82 is arranged on the covering panel 20 so as to be aligned with a corresponding mounting stud 32.

Figure 9:
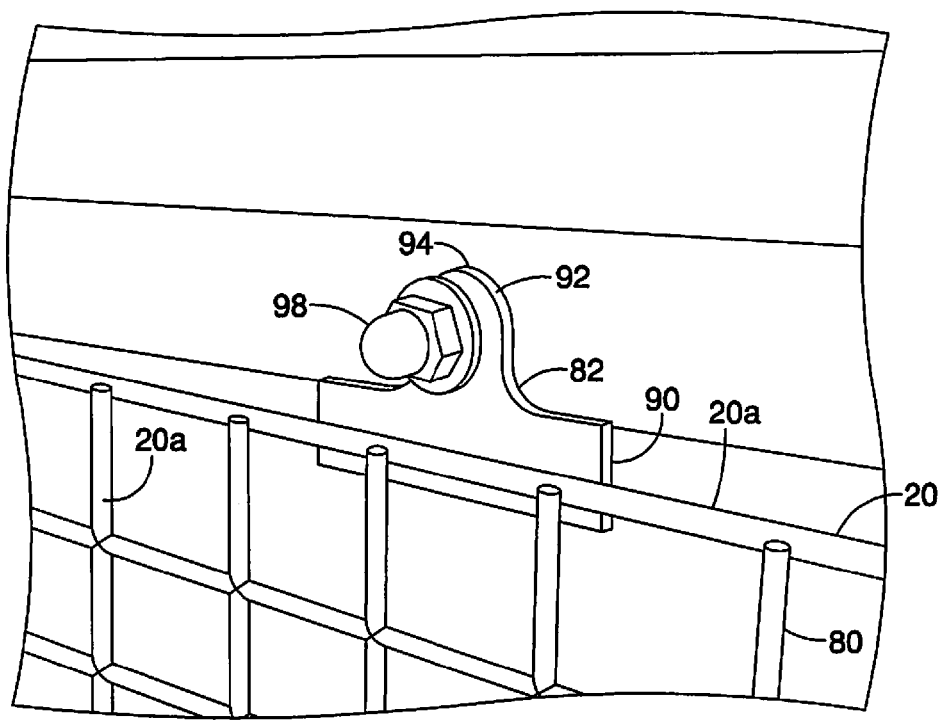
FIG. 9 illustrates an enlarged perspective view of an attachment bracket in the vehicle window assembly shown in FIG. 2.

On one embodiment, as shown in FIGS. 8 and 9, each attachment bracket 82 includes a mounting portion 90 and an attaching portion 92. The mounting portion 90 is generally rectangular and can be welded to the covering panel 20. In this embodiment, the mounting portion 90 can be attached to the wire 20*a* at the edges 80*a*-*d* of the covering panel 20. Since the wires 20*a* are circular, the mounting brackets 82 can be rotated around the longitudinal axis of the wire so as to properly align the attachment portion 92 with the body structure 16. This configuration enables the covering panel 20 to be applied to multiple window openings have differing structures. The attaching portion 92 is preferably unitary with the mounting portion 90 and extends therefrom. The attaching portion 92 can have a rounded tab portion 94 with an attachment opening 96 extending therethrough. The attachment opening 96 is configured to receive the threaded shaft 34 from the mounting stud 32. It is noted that the attachment brackets 82 can have any suitable structure and configuration and the structure disclosed herein is merely exemplary.

Figure 17:
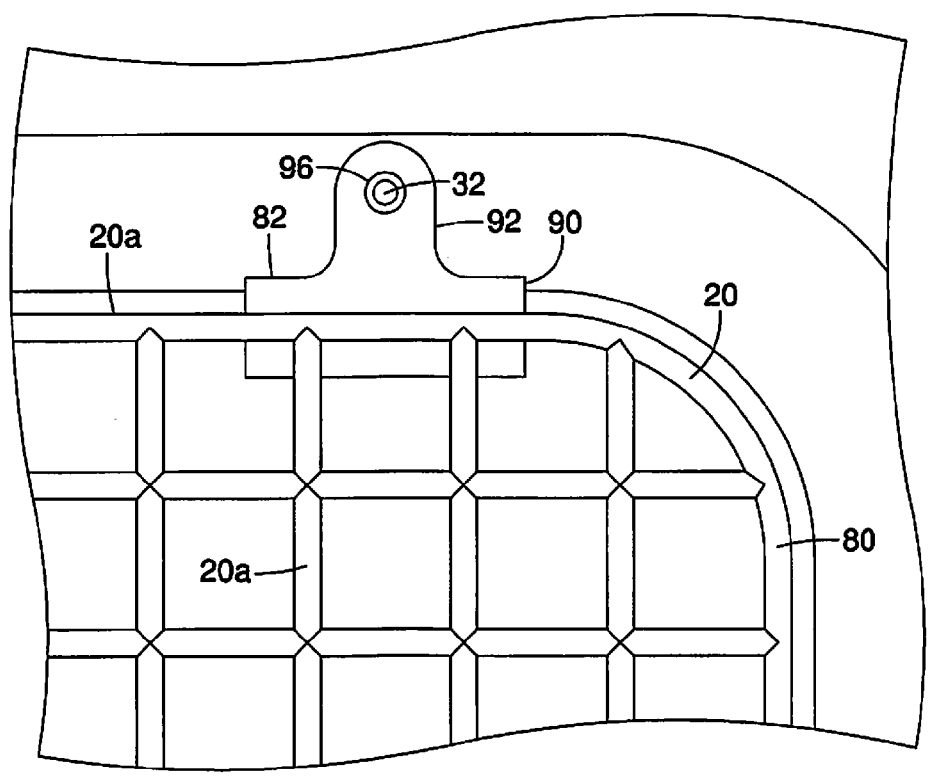
FIG. 17 is a front elevational view of a attachment bracket of the covering panel disposed adjacent a mounting stud of the body structure when the covering panel of FIG. 2 is in an unsecured state.
Figure 18:
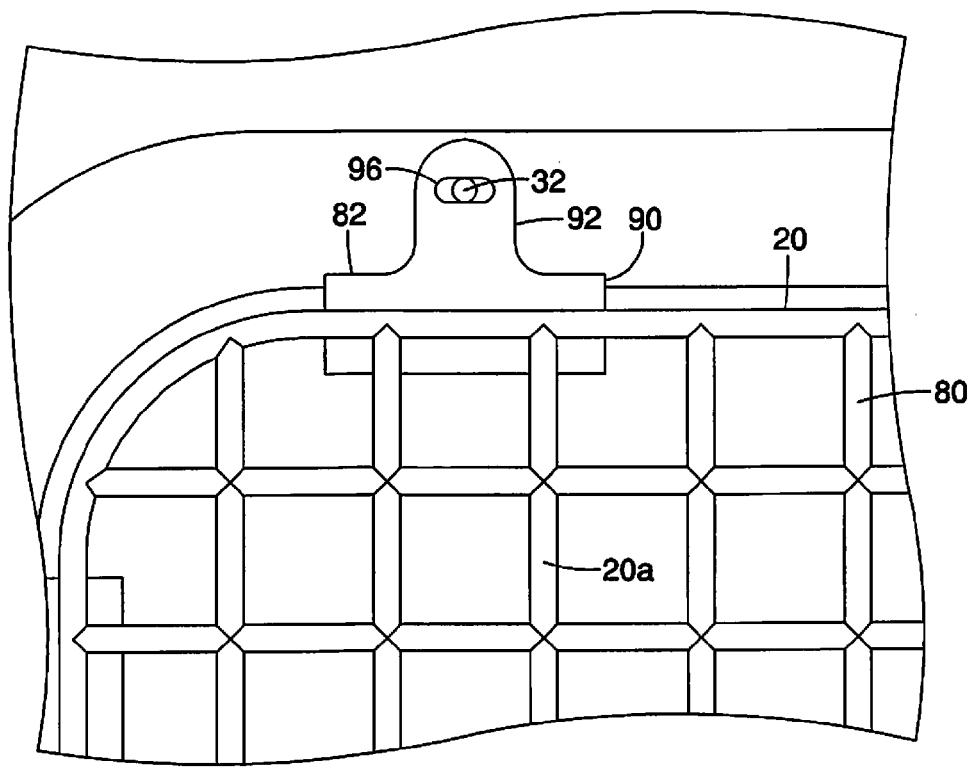
FIG. 18 is a front elevational view of another bracket of the covering panel disposed adjacent a mounting stud of the body structure when the covering panel of FIG. 2 is in an unsecured state.

The attachment brackets 82 can have an attachment opening 96 of any suitable size. For example, the attachment opening 96 can be a two way (FIG. 18) or a four way opening (FIG. 17) to facilitate alignment of the covering panel and insertion of all of the mounting studs 32 into all of the corresponding attachment brackets 82.

Figure 11:
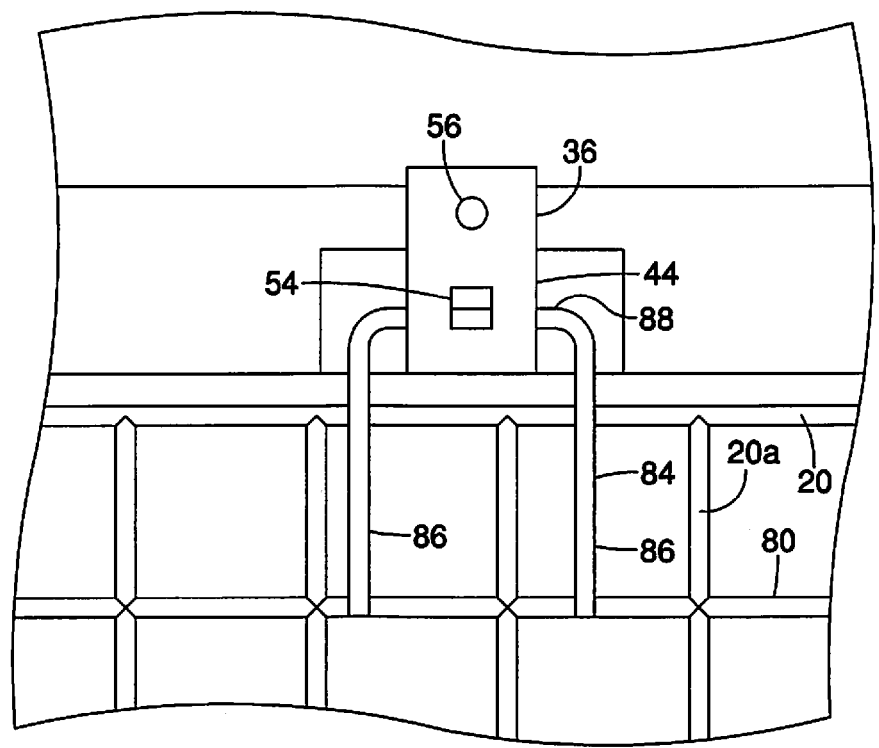
FIG. 11 is a front elevational view of the hinge base of the hinge structure shown in FIG. 3 with a hanging loop of the covering panel disposed on the hinge base.
Figure 12:
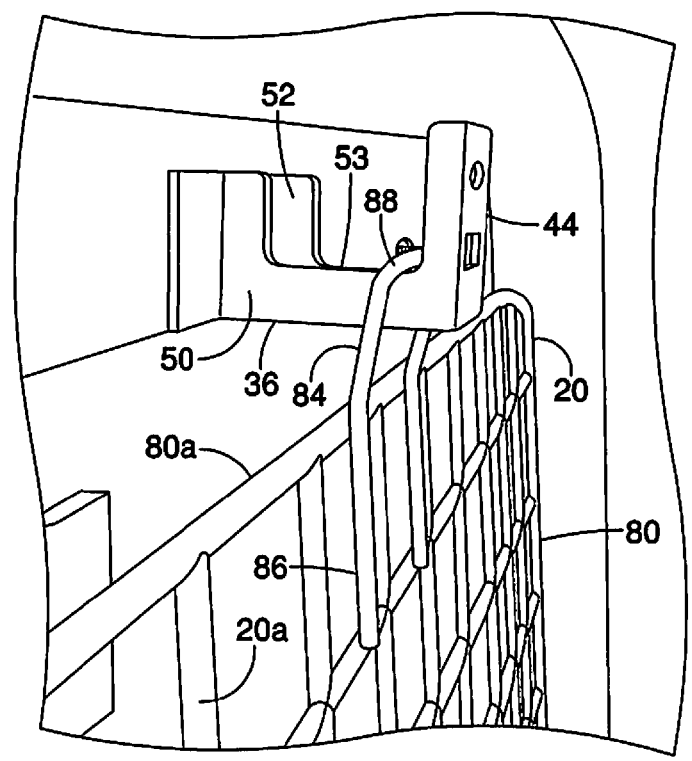
FIG. 12 is a side view of the hinge base and the hanging loop shown in FIG. 11.
Figure 13:
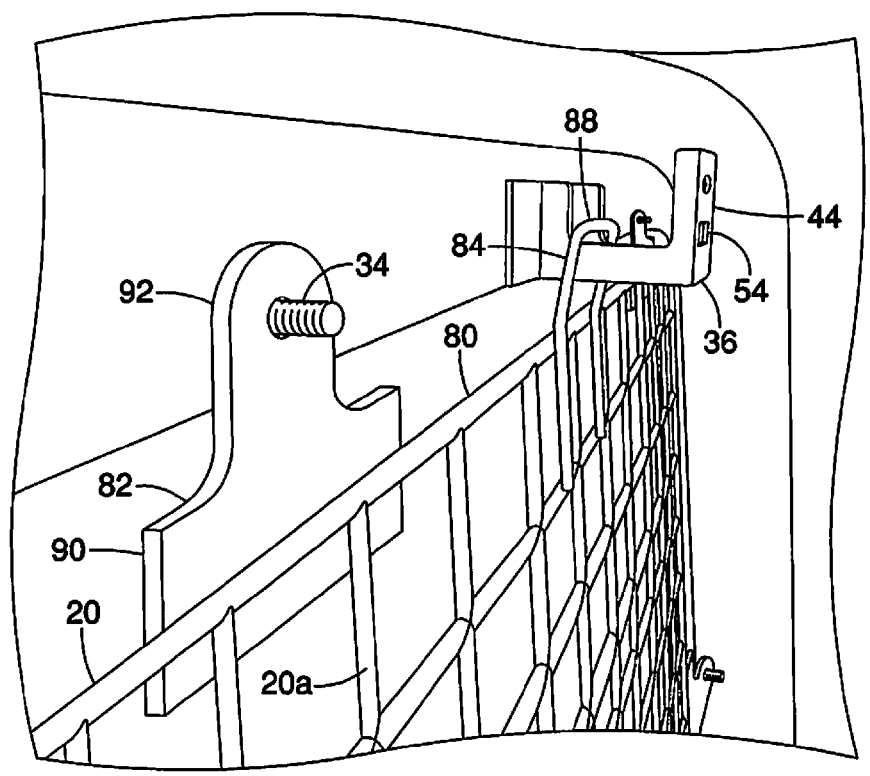
FIG. 13 is a side view of the attachment bracket disposed on the mounting stud.
Figure 14:
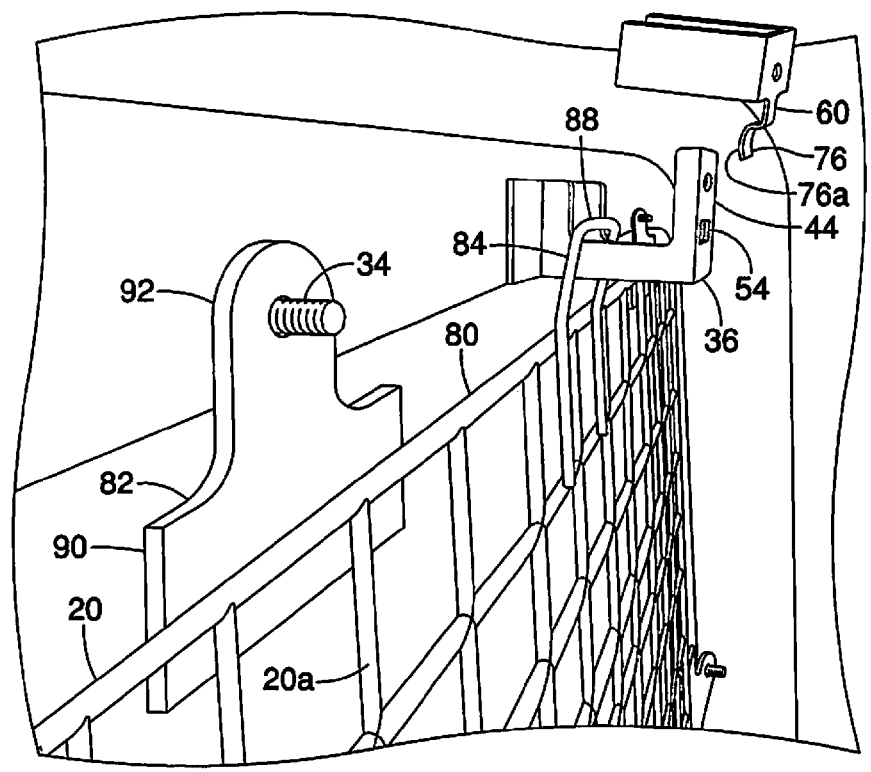
FIG. 14 is a side view of the hinge base, the hinge cover and the covering panel prior to installation of the hinge cover.
Figure 15:
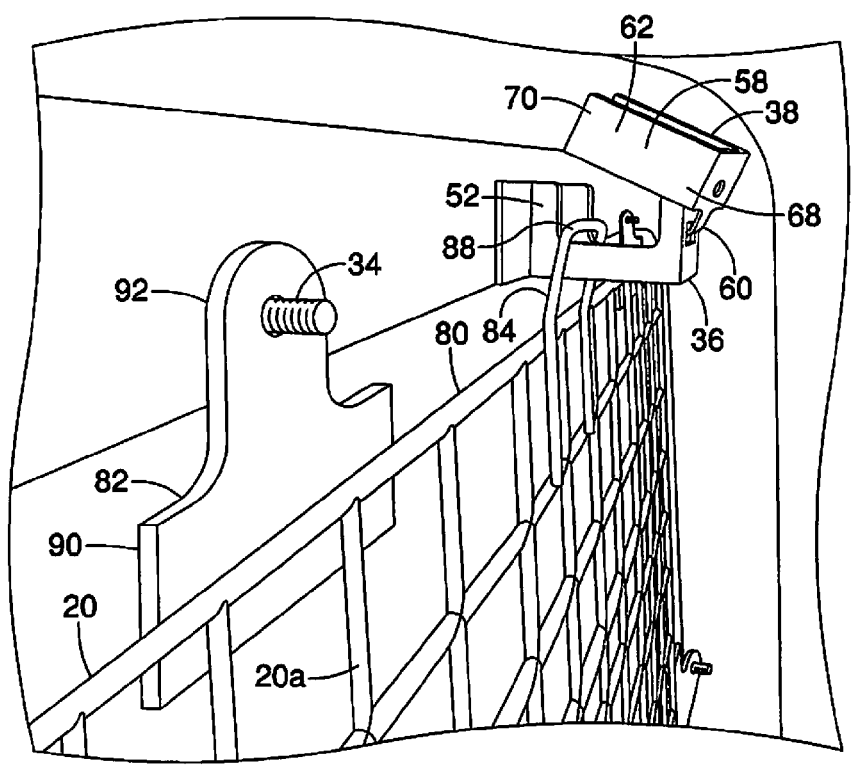
FIG. 15 is a side view of the hinge base, the hinge cover and the covering panel shown in FIG. 14 with the hinge cover being installed onto the hinge base.

Turning to FIGS. 11 and 12, to assemble the vehicle window assembly 12, the hanging loop 84 is disposed or hung onto the loop support portion 46 of the hinge base 36. In other words, the hanging section 88 of the hanging loop 84 is supported by the loop support section 46 when in the covering panel 20 is in the unsecured position. The hanging loop 84 is capable of moving or sliding along the loop support portion 46. The hinge cover 38 can then be positioned onto the hinge base 36. As shown in FIGS. 13-15, the mounting tab 60 of the hinge cover 38 is inserted into the tab aperture 54 of the hinge base 36, and rotated into position. As can be understood, the hinge cover 38 has a center of gravity outboard of a midpoint of the hinge cover 38, the center of gravity causing the engagement surface 76*a* of the mounting tab 60 to be biased into engagement with the outboard surface 44*b* of the wall 44*a*. Such an engagement maintains the hinge cover 38 is the proper position relative to the hinge base 36.

Figure 16:
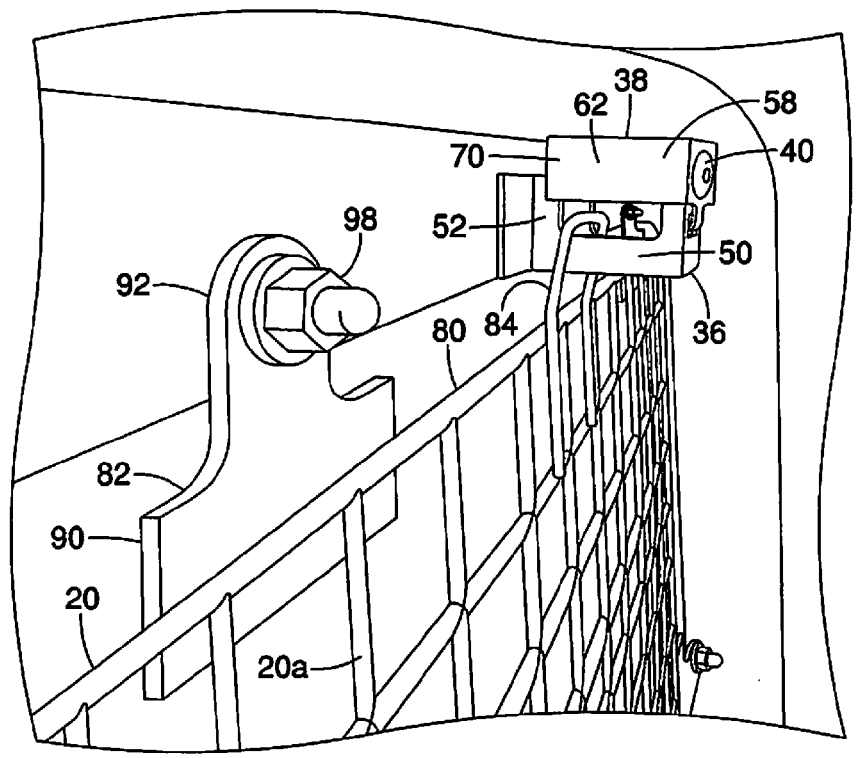
FIG. 16 is a side view of the hinge base, the hinge cover and the covering panel shown in FIG. 15 with the a fastener fastening the hinge cover to the hinge base.

As shown in FIG. 16, the hinge cover 38 and hinge base 36 form a space or area therebetween that allows the hanging loop 84 to move both laterally (i.e., in an inboard and outboard direction of the vehicle) and in an up and down (vertical) direction. Moreover, the hanging section 88 of the hanging loop 84 is spaced apart from the loop support portion 46 of the hinge base 36 and the retention flanges of a respective hinge structure 18 when the covering panel 20 is in the secured position with the studs 32 received by the attachment openings 96 of the attachment brackets 82 and supporting the covering panel 20.

Once the hinge cover 38 is positioned relative to the hinge base 36, a fastener 40 is inserted into the fastener opening 72 of the hinge cover 38 and through the fastener aperture 56 of the hinge base 36. The fastener 40 is preferably a non-removable fastener such as a rivet or any other suitable removable or non-removable fastener.

Preferably in this configuration, with the hanging loops 84 installed to the hinge base 36 and covered by the hinge cover 38, the attachment brackets 82 are aligned so as to contact the ends of the threaded shafts 34 of the mounting studs 32. That is, each of the attachment brackets 82 are aligned so as to contact the threaded shafts 34 to prevent the covering panel 20 from approaching the window opening 14. The attachment brackets 82 are further configured and aligned so that if the hanging loops 84 are in the unsecured positions and the attachment brackets 82 are unaligned with the mounting studs 32, at least the attaching portions 92 will contact the body structure 16 so as to prevent the covering panel 20 from approaching the window opening 14 or passing through the window opening 14.

Moreover, in this configuration (i.e. the unsecured position), as shown in FIG. 10, the hanging section 88 of the hanging loop 84 is disposed adjacent the cover mounting portion 44 of the hinge base 36. In other words, in the unsecured position, the hanging section 88 of the hanging loop 84 is disposed adjacent the cover mounting portion 44 of the hinge base 36 and the attachment brackets 82 are unattached to the mounting studs 32. In this position, the covering panel 20 extends at a predetermined angle such that the covering panel 20 extends downward from the hinge structure 18 and remains outboard of an inboard-most surface of the body structure 16, and does not contact the outer surface 100 or edge of the vehicle 10 when the body structure 16 (i.e., the door) is moved into an open position. That is, the covering panel 20, when in the unsecured position, extends downward from the hinge structure 18 so as to form a first outboard angle between the plane of the window opening 14 and a plane of the covering panel 20.

Figure 19:
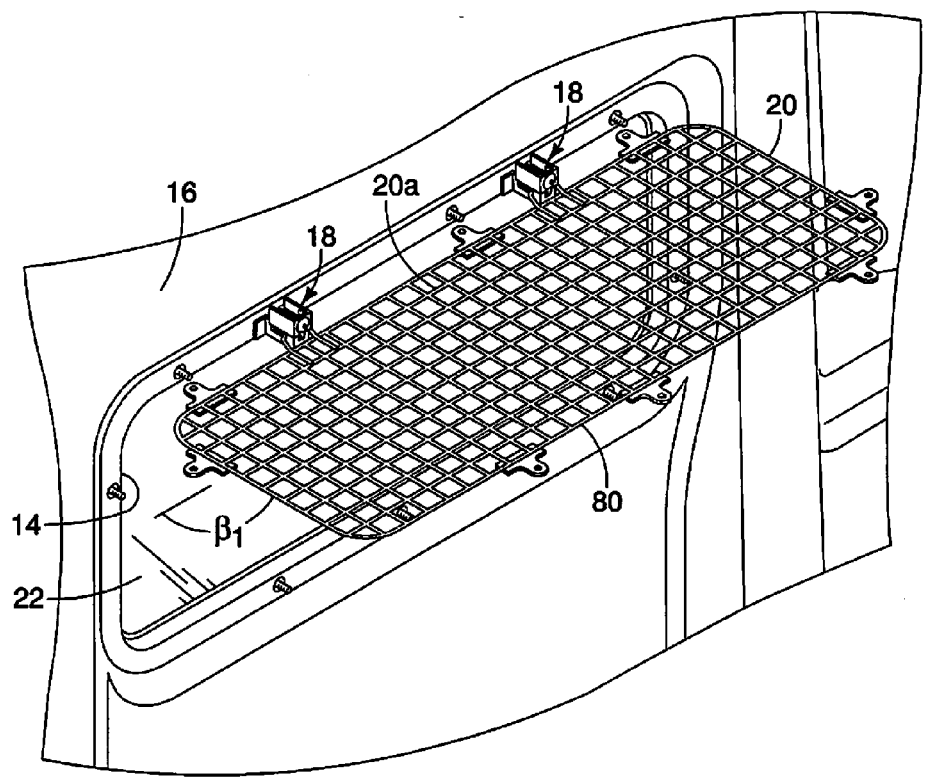
FIG. 19 is a side perspective view of the covering panel of FIG. 2 shown in an unsecured position and rotated to a window access position.
Figure 20:
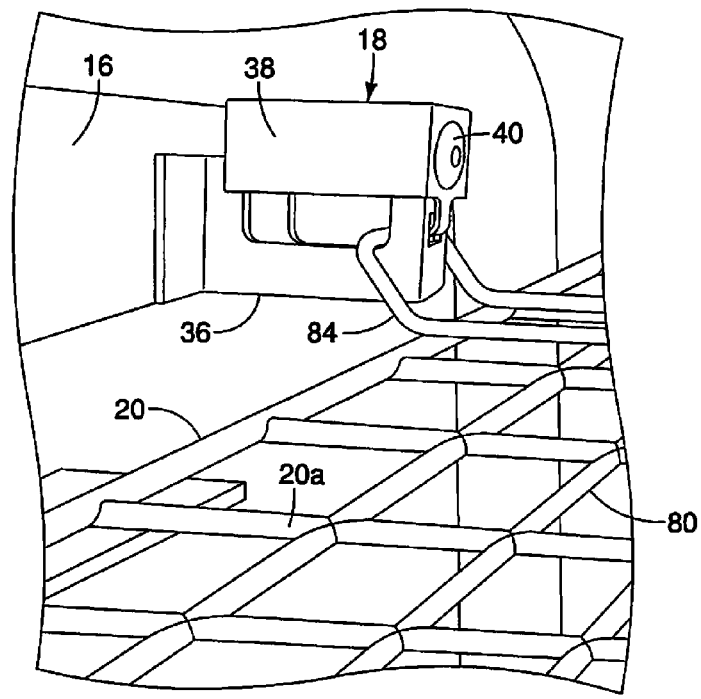
FIG. 20 is an enlarged side view of the hinge structure with the hanging loop in the unsecured position and the covering panel rotated to the window access position.

Further, the unsecured position enables the covering panel 20 to be moveable between a first position in which the covering extends at a first angle β to the plane of the window opening 14, and a second position in which the covering extends at a second angle $β_1$ to the plane of the window opening 14, the second angle $β_1$ being larger than the first angle β. See for example, FIGS. 19 and 20. This position enables the widow 22 and other areas of the body structure 16 to be cleaned. With the hinge cover 38 installed and fixed to the hinge base 36, trapping the hanging loop 84 therebetween, the covering panel 20 may be rotated to a window access position, but the covering panel 20 cannot be removed and will continue to protect the window opening 14 even if left unsecured (unattached to the mounting studs 32).

As shown in FIGS. 13 and 16-18, to secure the covering panel 20 to the body structure 16, the attachment brackets 82 are aligned with the mounting studs 32. The threaded shafts 34 of the mounting studs 32 are inserted into the attachment openings 96 of the attachment brackets 82 and a nut 98 (FIG. 16) is threaded onto the threaded shaft 34. Accordingly, the nut 98 being is disposed on the mounting stud 32 to sandwich the attaching portion 92 (attachment flange) between the body structure 16 and the nut 98, so as to retain the covering panel 20 in the secured position. In the secured position, the hanging section 88 of the hanging loop 84 is positioned adjacent the attachment portion 42 of the hinge base 36. In other words, in the secured position, the hanging section 88 of the hanging loop 84 is positioned adjacent the attachment portion 42 of the hinge base 36 and the attachment brackets 82 are installed on the mounting studs 32 and the covering panel 20 extends parallel to a plane of the window opening 14.

As can be understood, by removing the nuts 98, the covering panel 20 is movable between a secured position in which the hanging section 88 of the hanging loop 84 is positioned adjacent the attachment portion 42 of the hinge base 36 and the attachment brackets 82 are installed on the mounting studs 32 and the covering panel 20 extends parallel to a plane of the window opening 14, and an unsecured position in which the hanging section 88 of the hanging loop 84 is disposed adjacent the cover mounting portion 44 of the hinge base 36 and the attachment brackets 82 are unattached to the mounting studs 32, enabling the covering panel 20 to be moveable between a first position in which the covering extends at a first angle to the plane of the window opening 14, and a second position in which the covering extends at a second angle to the plane of the window opening 14, the second angle being larger than the first angle.

Second Embodiment

Figure 21:
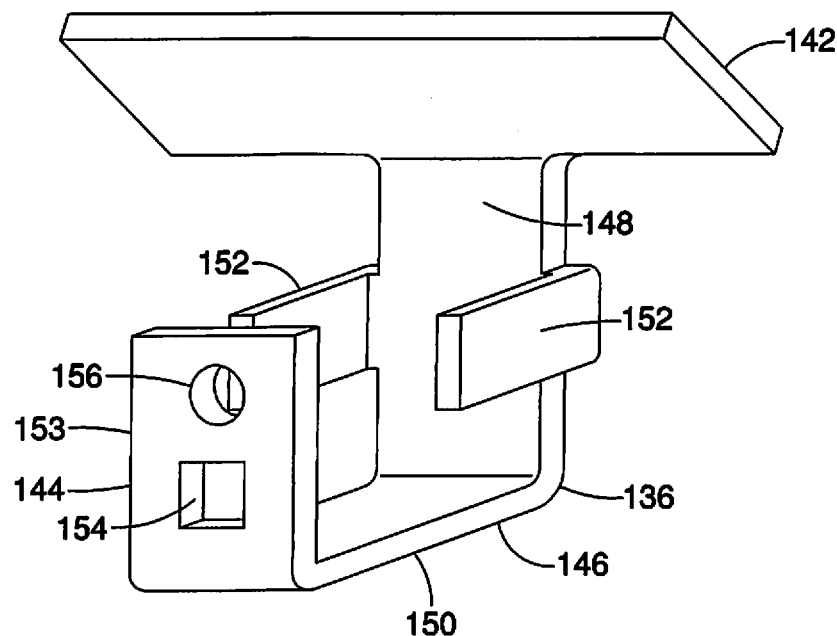
FIG. 21 illustrates another embodiment of the hinge base.
Figure 22:
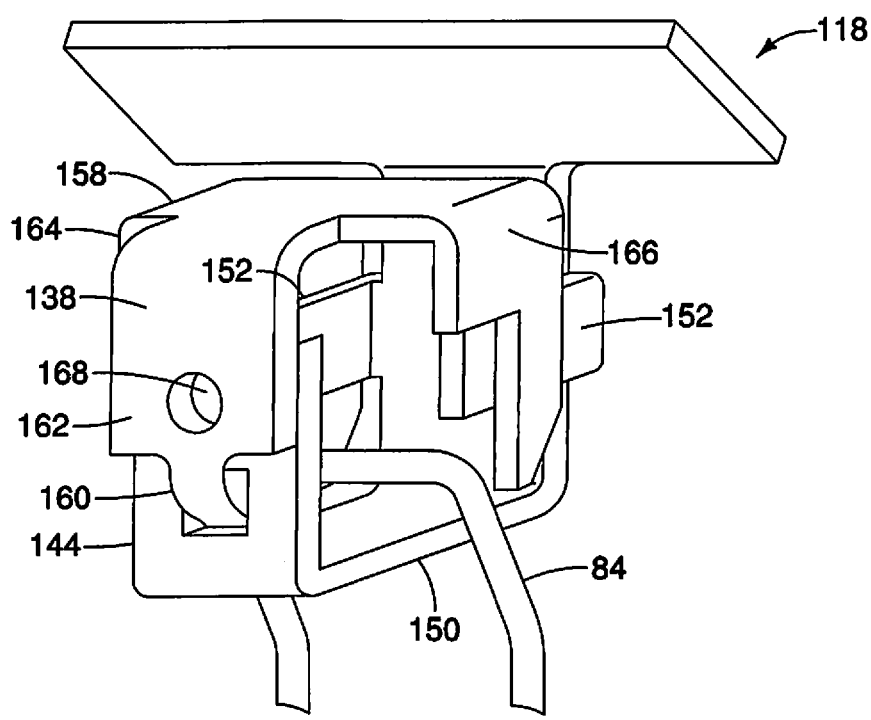
FIG. 22 illustrates the hinge base shown in FIG. 21 with another embodiment of a hinge cover.
Figure 23:
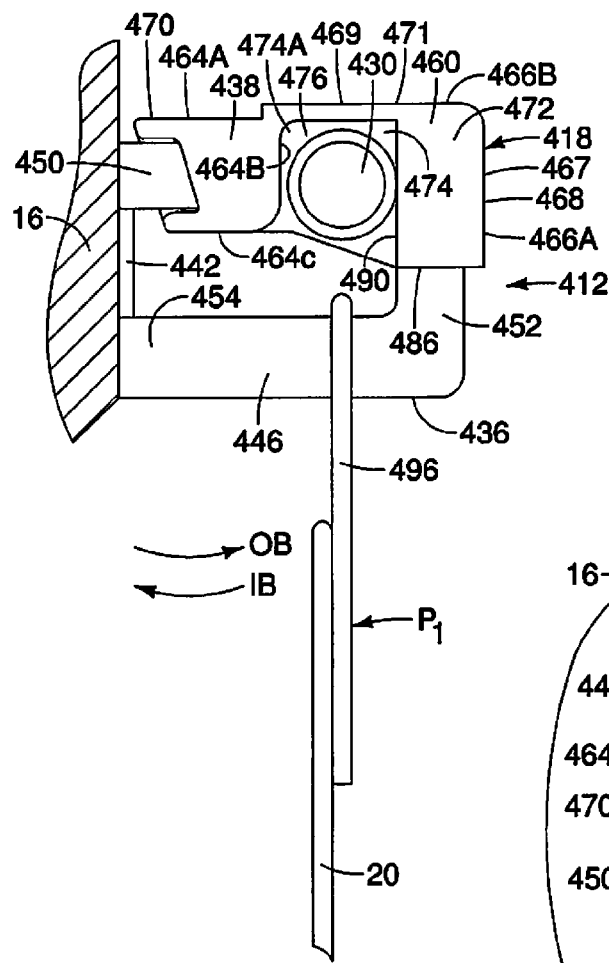
FIG. 23 is a side view of the hinge structure according to another embodiment of the present invention, with the covering panel in an unsecured position.
Figure 24:
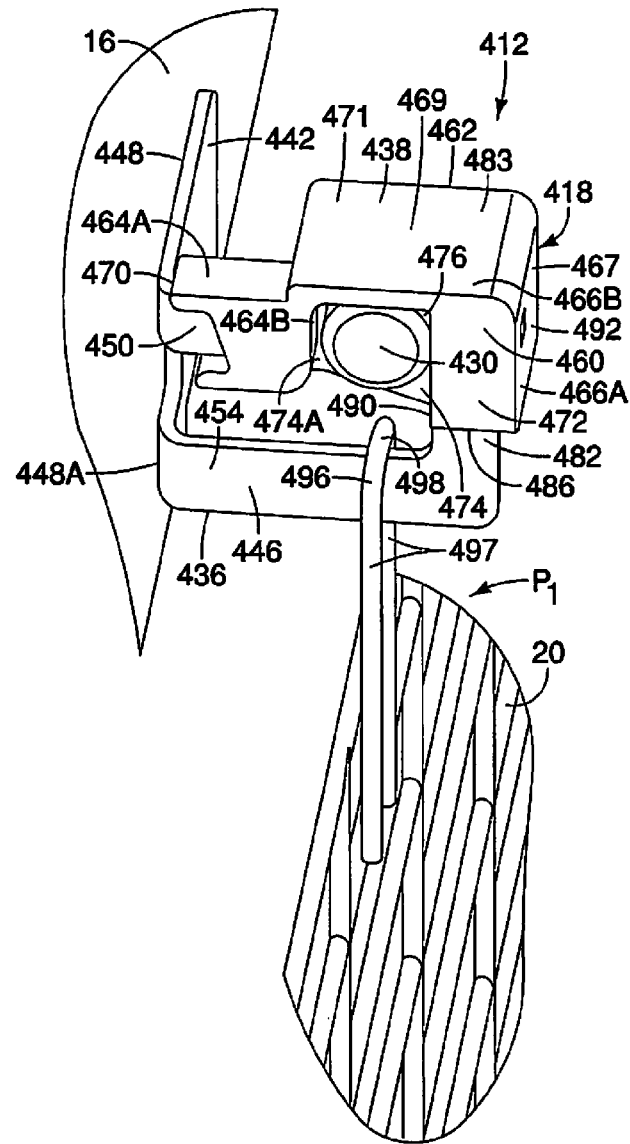
FIG. 24 is a top perspective view of the hinge structure shown in FIG. 23.
Figure 25:
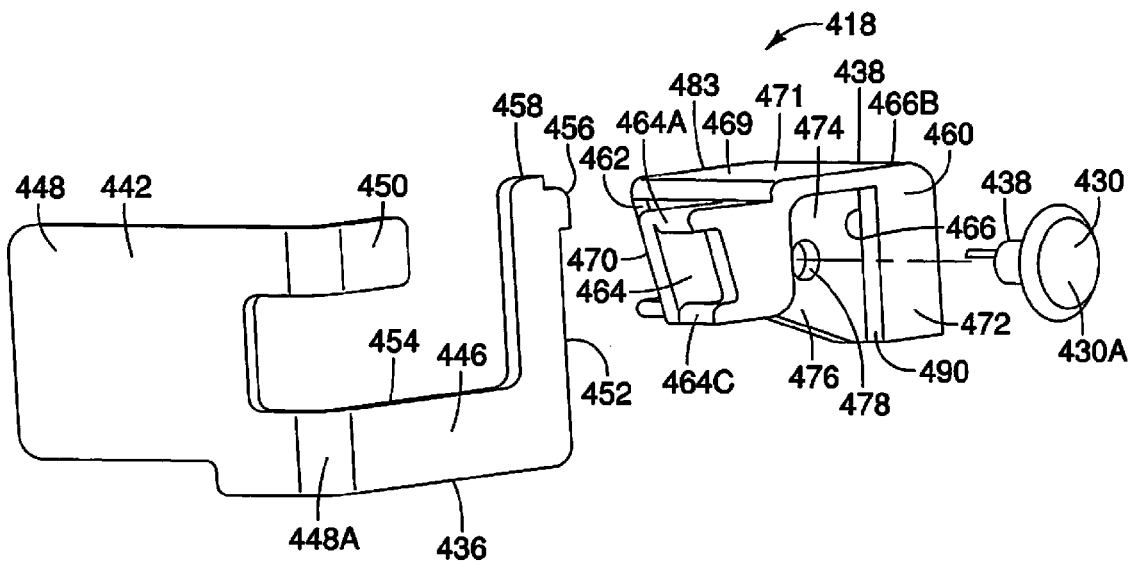
FIG. 25 is an exploded view of the hinge structure shown in FIG. 23.
Figure 26:
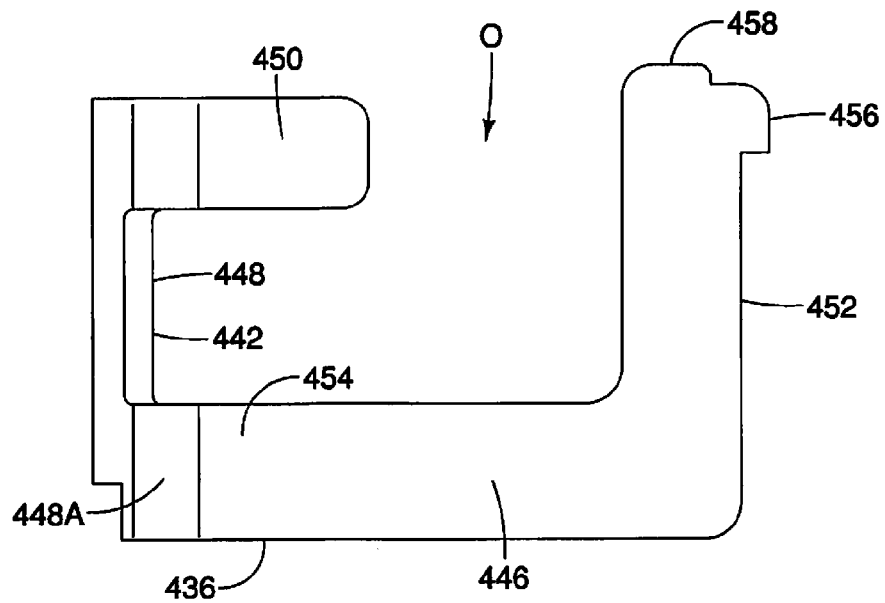
FIG. 26 is a side elevational view of the hinge base of the hinge structure shown in FIG. 23.

Referring now to FIGS. 21 and 22 in accordance with a second embodiment of the hinge structure 118 will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIGS. 21 and 22 illustrate a hinge structure 118 according to the second embodiment. As shown in FIG. 21, the hinge base 136 includes an attachment portion 142, a cover mounting portion 144, and a loop support portion 146.

In one embodiment, the attachment portion 142 is a generally rectangular flange that is proximal to and rigidly attached to the upper portion 24 of the body structure 16. In this embodiment the attachment portion 142 extends generally inwardly into the vehicle 10, as to facilitate attachment of the hinge base 136 to the upper portion 24 of the body structure 16. The attachment portion 142 can be any suitable configuration, and can be attached to the upper portion 24 of the body structure 16 in any suitable manner, such as welding or adhesive.

The hinge base 136 generally includes an upright portion 148 attached to and extending between the attachment portion 142 and the loop support portion 146. The upright portion 148 includes opposed retention flanges 152 extending therefrom. The retention flanges 152 generally extend inboard at a 90 degree angle from the upright portion 148. The loop support portion 146 includes a flat section 150 extending inboard from the upright portion 148 in a generally perpendicular manner, or at any suitable angle. In this embodiment, the flat section 150 extends from the upright portion 148 at an angle of more than 90 degrees.

The cover mounting portion 144 is attached to the loop support portion 146 such that the cover mounting portion 144 extends upwardly from the loop support portion 146. The cover mounting portion 144 extends generally upwardly and perpendicularly from the loop support portion 146. The cover mounting portion 144 includes a generally rectangular wall 153 that extends between, and includes a tab aperture 154 and a fastener aperture 156. In this embodiment, the fastener aperture 156 and the tab aperture 154 are both disposed approximately along the center line of the cover mounting portion 144 with the fastener aperture 156 being disposed above the tab aperture 154. The tab aperture 154 is generally rectangular and the fastener aperture 156 is generally circular. However, each aperture can be any suitable shape or configuration.

As shown in FIG. 22, the hinge cover 138 is generally a unitary, metal structure and includes a cover portion 158 and a mounting tab 160. The cover portion 158 includes a mounting wall 162, a first extension 164 (retention flange), and a second extension 166 (retention flange). In other words, the hinge cover 138 includes two opposed retention arms. The first and second extensions 164, 166 can be generally parallel or extend at any suitable angle relative to each other. For example, in one embodiment, the first and second extensions 164, 166 extend away from each other from the proximal ends to the distal ends. The mounting wall 162 is generally rectangular, but can be any suitable shape, and has a generally circular fastener opening 168. The fastener opening 168 is preferably disposed along the center line of the cover portion 158 and is configured to align with the fastener aperture 156 of the hinge base 136.

Similarly to the embodiment discussed above, the mounting tab 160 of the hinge cover 138 is inserted into the tab aperture 154 of the hinge base 136, and rotated into position. As can be understood, the hinge cover 138 has a center of gravity outboard of a midpoint of the hinge cover 138, the center of gravity causing the engagement surface of the mounting tab 160 to be biased into engagement with the outboard surface of the cover mounting portion 144. Such an engagement maintains the hinge cover 138 is the proper position relative to the hinge base 136.

The hinge cover 138 and hinge base 136 form a space or area therebetween that allows the hanging loop 84 to move both laterally (i.e., in an inboard and outboard direction of the vehicle) and in an up and down (vertical) direction. Moreover, the hanging section 88 of the hanging loop 84 is spaced apart from the loop support portion 146 of the hinge base 136 and the first and second extensions 164, 166 of the hinge cover 138 of a respective hinge structure 118 when the covering panel 20 is in the secured position.

Once the hinge cover 138 is positioned relative to the hinge base 136, a fastener 40 is inserted into the fastener opening 168 of the hinge cover 138 and through the fastener aperture 156 of the hinge base 136. The fastener 40 is preferably a non-removable fastener such as a rivet or any other suitable removable or non-removable fastener.

Third Embodiment

In this embodiment, the steel wire and attachment brackets of the covering panel 20 are replaced with a polycarbonate sheet. The attachment brackets and hanging loops can be attached to the polycarbonate sheet by fasteners, for example. The attachment brackets and hanging loops can extend outwardly or inwardly from the periphery of the polycarbonate sheet. In this embodiment the polycarbonate sheet can be 3 to 4 mm in thickness with the attachment brackets being about 1.6 mm thick.

The vehicle body structure 16 is a conventional component that is well known in the art. Since vehicle body structure 16 is well known in the art, these structures will not be discussed or illustrated in detail herein. Rather, it will be apparent to those skilled in the art from this disclosure that the components can be any type of structure and/or programming that can be used to carry out the present invention.

Fourth Embodiment

FIGS. 23-32 illustrate a fourth embodiment of a hinge structure 418. In this embodiment, the body structure 16 and the covering panel 20 are substantially similar to those described above. Therefore, any description of these structures not modified herein will be identical to the description above.

Similarly to the embodiment disclosed above, in this embodiment, the vehicle window assembly 412 can include two hinge structures 418. However, it is noted that the vehicle window assembly 12 can include any suitable number of hinge structures 418. Since each of the hinge structures 418 is substantially identical, only one hinge structure 418 will be described herein. As shown in FIGS. 23-29, the hinge structure 418 is a generally L-shaped structure that includes a hinge base 436 and a hinge cover 438, which are coupled together with a fastener 440. The hinge base 436 is a metal structure that includes an attachment portion 442, a first cover mounting portion 450 and a second cover mounting portion 452, and a support portion 446.

In one embodiment, the attachment portion 442 has a generally rectangular flange 448 that is proximal to and rigidly attached to the upper portion 24 of the body structure 16. However, the attachment portion 442 can be any suitable configuration, have any suitable number of flanges, and can be attached to the upper portion 24 of the body structure 16 in any suitable manner, such as welding or adhesive.

The support portion 446 generally includes a longitudinal section 454 extending from one end 448A of the flange 448 of the attachment portion 42 so as to form an L-shaped configuration. It is noted that the longitudinal section 454 can extend from any portion or end of the flange 448 desired. The longitudinal section 454 can extend inboard from the flange 448 in a generally perpendicular manner, or at any suitable angle. In this embodiment, the longitudinal section 454 extends from the flange 448 at an angle of about 90 degrees.

The second cover mounting portion 452 is attached to the support portion 446 such that the support portion 446 extends between the attachment portion 442 and the second cover mounting portion 452. The second cover mounting portion 452 extends generally upwardly and perpendicularly from the inboard end of the support portion 446. The second cover mounting portion 452 includes a generally rectangular mounting tab 456 extending inboard from the free end 458 of the second cover mounting portion 452. The mounting tab 456 extends substantially parallel to the first cover mounting portion 450. The mounting tab 456 is generally disposed adjacent the free end 458 of the second cover mounting portion 452, but may be disposed at any suitable location.

The first cover mounting portion 450 is generally rectangular and extends from the flange 448 in an inboard direction, generally parallel to the longitudinal section 454 of the support portion 446. Moreover, in one embodiment, the first cover mounting portion 450 extends at generally the same height as the free end 458 of the second cover mounting portion 452. The first mounting portion 450 and the second mounting portions 452 thus define an opening O therebetween.

Figure 28:
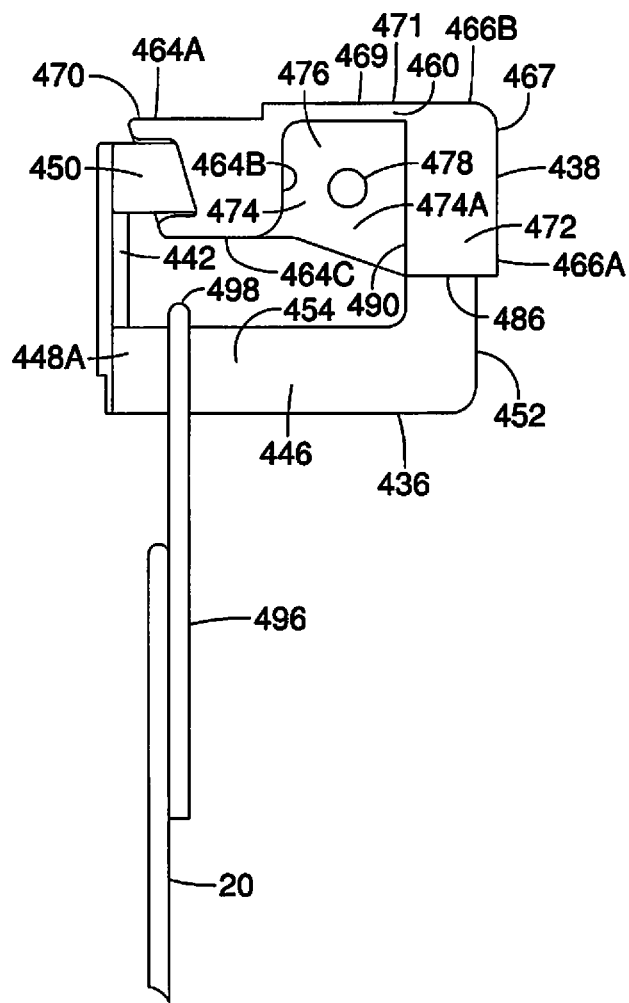
FIG. 28 is a side elevational view of the hinge cover mounted on the hinge base of the hinge structure shown in FIG. 27.
Figure 29:
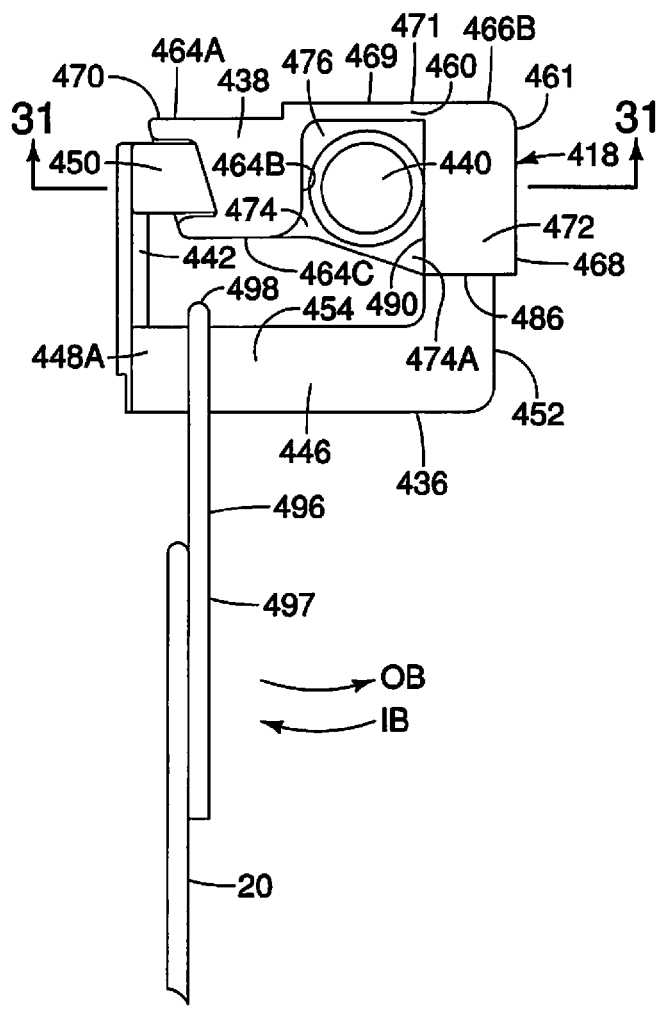
FIG. 29 is a side elevational view of the hinge cover mounted on the hinge base with a fastener inserted into the fastener recess of the hinge structure shown in FIG. 27.
Figure 30:
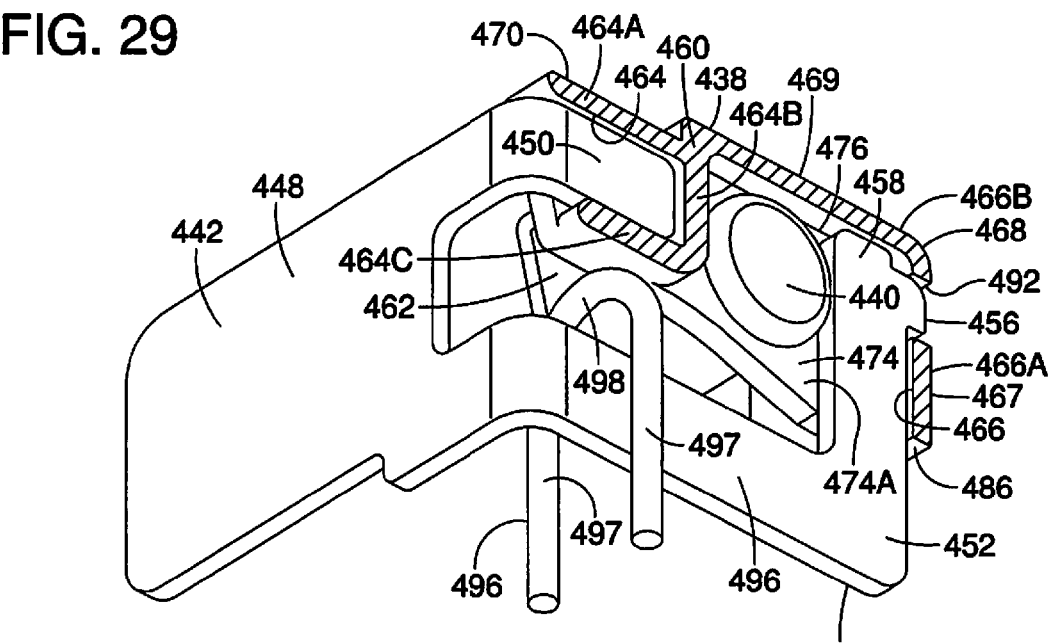
FIG. 30 is perspective view in section of the hinge structure shown in FIG. 23.

As shown in FIGS. 23-25 and 27-31, the hinge cover 438 is generally a unitary, plastic structure and includes a cover portion 460, a guard portion 462, a first mounting slot 464 and a second mounting slot 466. As shown in FIG. 30, the cover portion 460 is a generally rectangular or trapezoidal shaped member, and has an inboard wall 467 at an inboard end 468, an outboard end 470, a top wall 469 at a top side 471, a first side wall 472, a second side wall 473, and a third side wall 474 disposed between the first side wall 472 and the second side wall 473. The cover portion 460 defines a recess portion 476 on a first side 474A of the third side wall 474, with the guard portion 462 disposed opposite the recess portion 476 on the on a second side 474B of the third side wall 474. The recess portion 476 is generally rectangular and is disposed between the first mounting slot 464 and the second mounting slot 466. However, recess portion 476 can be any suitable configuration desired. The recess portion 476 includes a fastener hole 478 defined therein, passing from the first side of the third side wall 474 to the second side of the third side wall 474.

Figure 31:
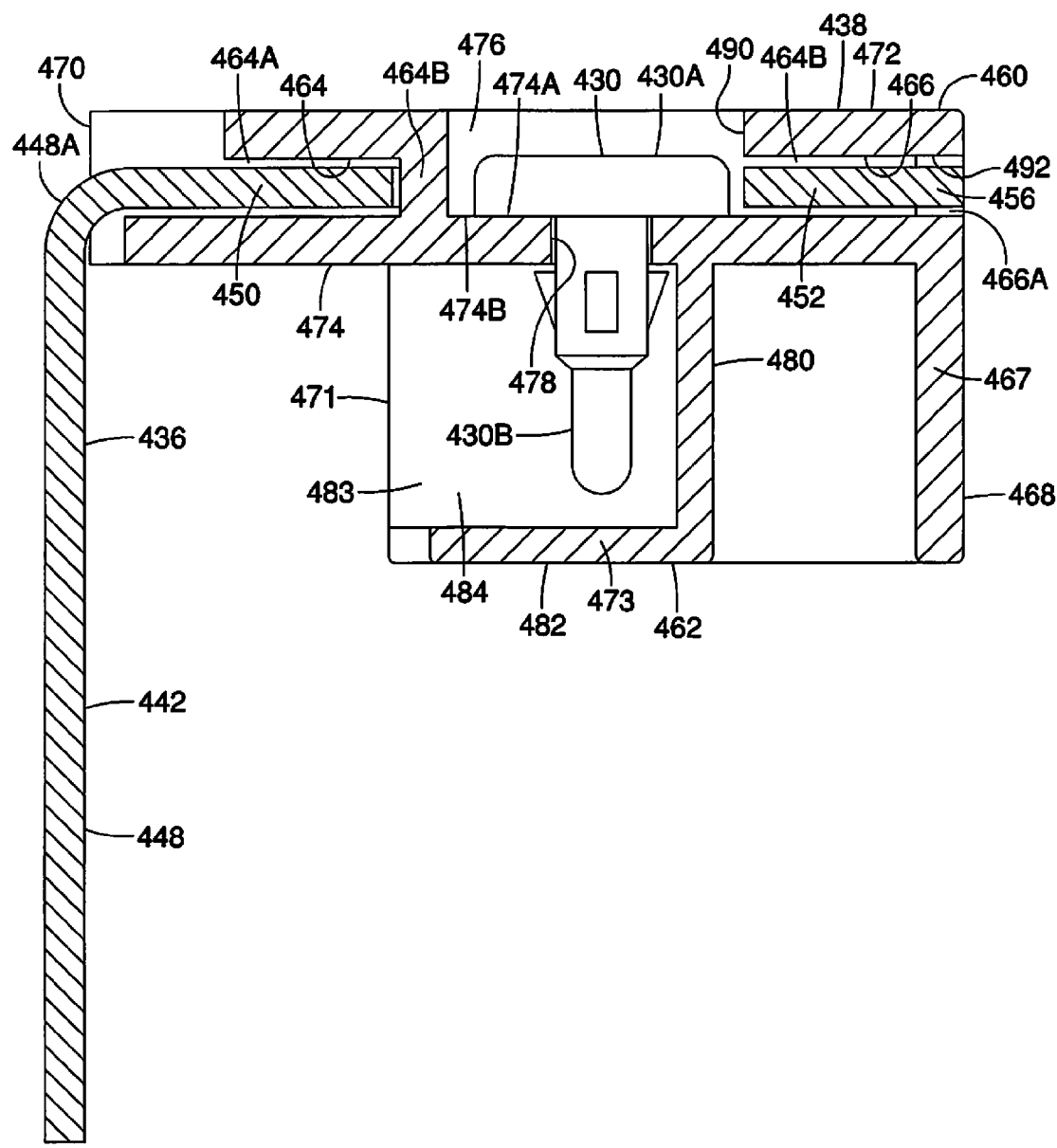
FIG. 31 is a cross sectional view of the hinge structure taken along lines 31-31 in FIG. 29.
Figure 32:
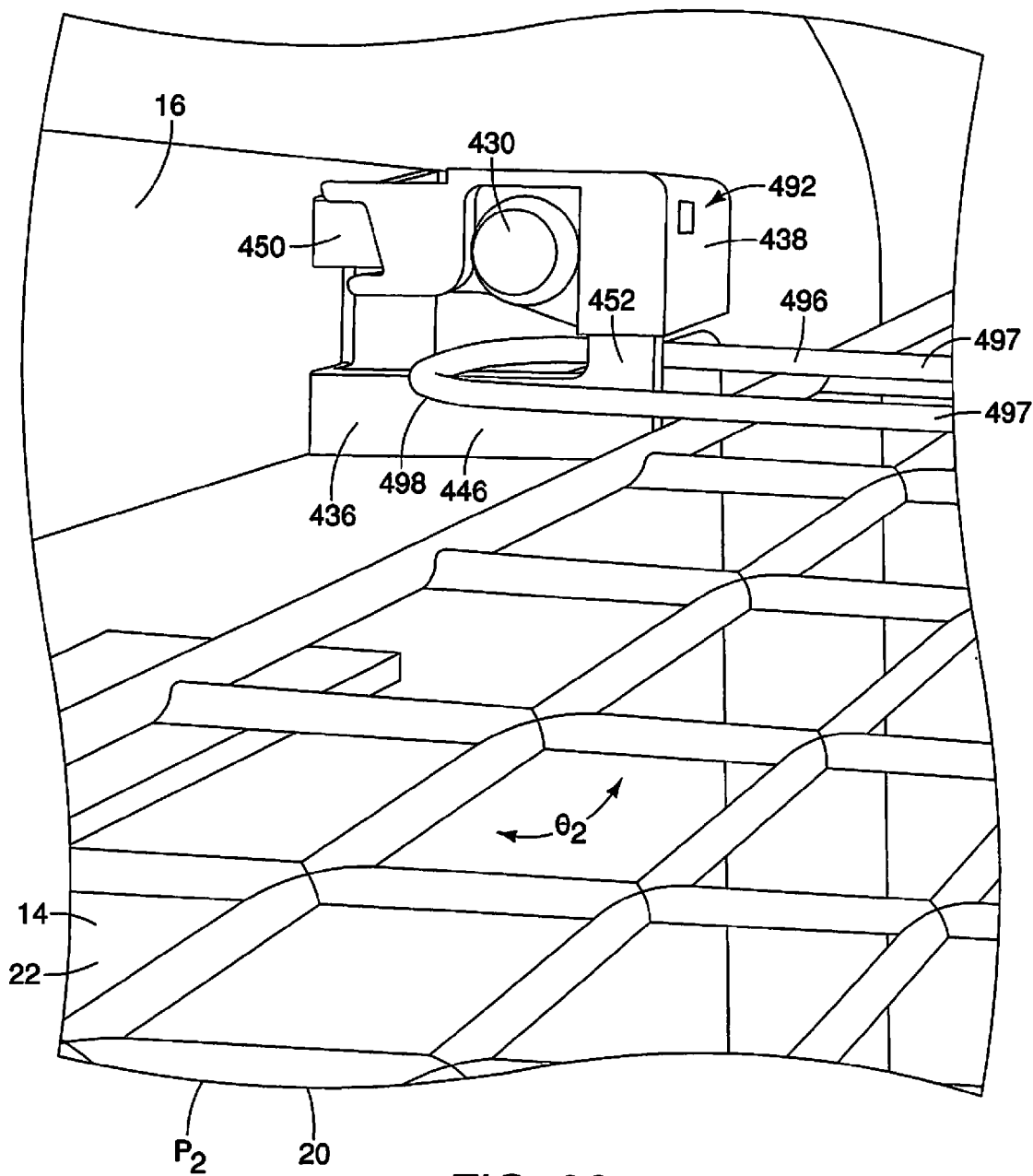
FIG. 32 is an enlarged side view of the hinge structure shown in FIG. 23 with the hanging loop in the unsecured position and the covering panel hanginh gernally vertically.

As shown in FIG. 31, the guard portion 462 has a first wall 480 extending transverse from the second side of the third side wall 474, a second wall 482 extending transverse to the first wall 480 and parallel to the third side wall 474, and a top wall 483 (a portion of or contiguous with the top wall 471 of the cover portion 460). The first wall 480, the second wall 482, and the top wall 483 define a generally cubic cavity 484 for receiving an end of a fastener 430, as discussed herein.

The first mounting slot 464 is disposed at the outboard end 470 and opens in the outboard direction OB. The first mounting slot 464 extends in the inboard direction, and can be configured in any manner to receive the first cover mounting portion 450. In this embodiment, the first mounting slot 464 is generally rectangular and bounded by the third wall 474, a top wall 464A (a portion of the top wall 471), an inboard wall 464B extending transversely from the first side of the third side wall 474, a bottom wall 464C, and the second side wall 472. The second mounting slot 466 is disposed on the inboard side 468 of the cover portion 460 and is open at a bottom side 486 and an outboard side 490 thereof to receive the second cover mounting portion 452 when inserted from the recess portion 476. The second mounting slot 466 extends in an upwardly direction and is bounded by an inboard wall 466A (a portion of the inboard wall 467), a top wall 466B (a portion of the top wall 471), the first side wall 472 and the third side wall 474. A mounting tab opening 492 is disposed in the inboard wall 466A of the second mounting slot 466 proximate to an upper inboard edge of the cover portion 460 where the inboard wall 466A and the top wall 466B meet. Thus, the mounting tab opening 492 is in communication with the second mounting slot 466. The mounting tab opening 492 is generally rectangular, but can be any suitable configuration that is sized and configured to receive the mounting tab 456 of the second mounting portion 452.

In operation, the attachment portion 442 of the hinge base 436 is attached to the body structure 16 as described herein. The hanging loop 496 is then positioned on the support portion 446 by passing through the opening O between the first and second mounting portions 450 and 452. In this embodiment, the hanging loop 496 has substantially straight upwardly extending sections 497, and the hanging section 498 can be thinner than the hanging section 88 discussed above.

Figure 27:
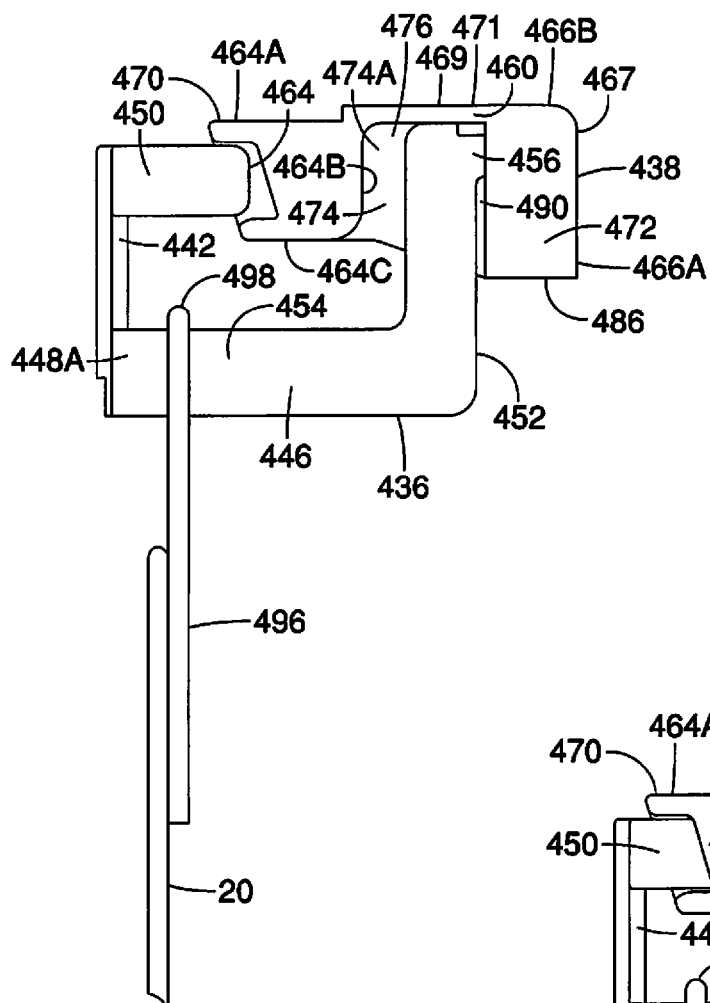
FIG. 27 is a side elevational view of the hinge cover being mounted on the hinge base of the hinge structure shown in FIG. 26.

The hinge cover 438 is then attached to the hinge base 436. As shown in FIG. 27, the hinge cover 438 is positioned such that the first mounting slot 464 is positioned to receive the first cover mounting portion 450, and the second mounting slot 466 is positioned to receive the second cover mounting portion 452. The hinge cover 438 can then be moved in an outward or outboard direction OB such that the first mounting slot 464 receives the first cover mounting portion 450 and the second mounting slot 466 receives the second cover mounting portion 452 (FIG. 28). Additionally, the mounting tab 456 is inserted into the mounting opening 492 (FIG. 30). The fastener 430 is then inserted into the fastener opening 478 (FIG. 29) to couple the hinge cover 438 to the hinge base 436. The fastener 430 is preferably a plastic fastener with a head 430A and a shaft 430B. The shaft 430B is inserted into the opening 478 and extends into the rectangular area 484 of the guard portion 462. Based on the configuration of the walls 480 and 482 of the guard portion 462, insertion of a device into the guard portion 462 is substantially inhibited, preventing removal of the fastener 430 and thus separation of the cover portion 438 from the hinge base 436. The fastener 430 can be any suitable fastener that is difficult to remove from an opening 478 once inserted therein.

As shown in FIGS. 29 and 30, the head 430A of the fastener 430 is disposed adjacent the outboard side 490 of the second mounting slot 466, and is sized and configured to prevent the hinge cover 438 from moving in the inboard direction IB relative to the hinge base 436. Accordingly, the head 430A of the fastener 430 is disposed adjacent the outboard side 490 of the second mounting slot 466. Moreover, since the mounting tab 456 is disposed in the opening 492, hinge cover 438 cannot be moved in the vertical or downward direction relative to the hinge base 436. Further, the first mounting portion 450 when disposed in the first mounting slot 464 is bounded by the three walls 464A, 464B and 464C defining the first mounting slot 464 and the first side wall 472 and the second side wall 474, preventing movement of the first mounting portion 450.

Preferably in this configuration, similarly to the embodiments discussed above, with the hanging loops 496 installed to the hinge base 436 and covered by the hinge cover 438, the attachment brackets 82 are aligned so as to contact the ends of the threaded shafts 34 of the mounting studs 32. That is, each of the attachment brackets 82 are aligned so as to contact the threaded shafts 34 to prevent the covering panel 20 from approaching the window opening 14. The attachment brackets 82 are further configured and aligned so that if the hanging loops are in the unsecured positions and the attachment brackets 82 are unaligned with the mounting studs 32, at least the attaching portions 92 will contact the body structure 16 so as to prevent the covering panel 20 from approaching the window opening 14 or passing through the window opening 14.

Figure 33:
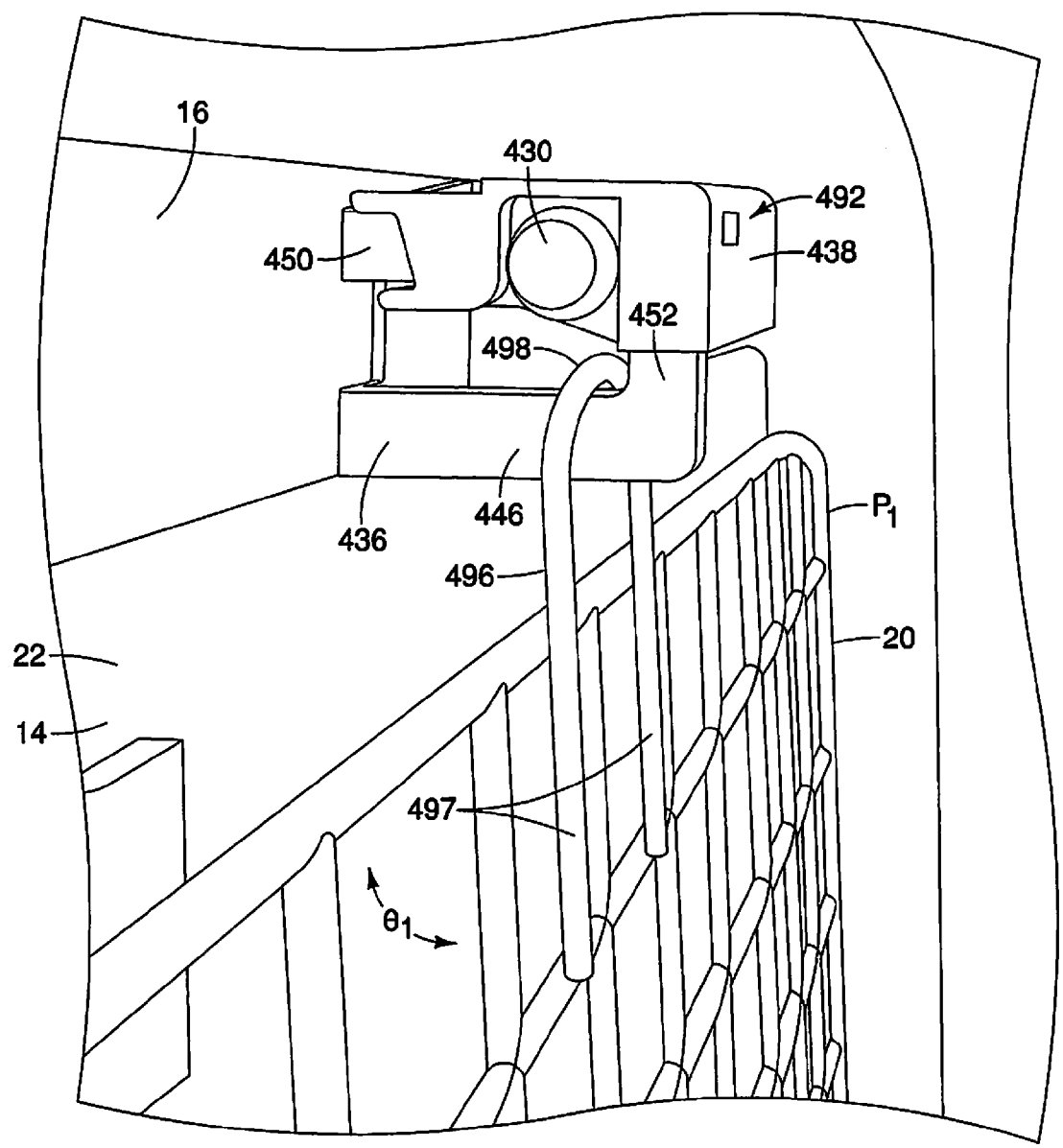
FIG. 33 is an enlarged side view of the hinge structure shown in FIG. 23 with the hanging loop in the unsecured position and the covering panel rotated to the window access position.

Moreover, in this configuration (i.e. the unsecured position), as shown in FIG. 33, the hanging section 498 of the hanging loop 496 is disposed adjacent the second cover mounting portion 452 of the hinge base 436. In other words, in the unsecured position, the hanging section 498 of the hanging loop 496 is disposed adjacent the second cover mounting portion 452 of the hinge base 436 and the attachment brackets 82 are unattached to the mounting studs 32. In this position, the covering panel 20 extends downwardly from the hinge structure 418 and remains outboard of an inboard-most surface of the body structure 16, and does not contact the outer surface 100 or edge of the vehicle 10 when the body structure 16 (i.e., the door) is moved into an open position.

Further, the unsecured position enables the covering panel 20 to be moveable between a first position $P_1$ in which the covering extends generally a first angle $\phi_1$ relative to the plane of the window opening 14, and a second position $P_2$ in which the covering extends at an angle $\phi_2$ to the plane of the window opening 14, the second angle $\phi_2$ being larger than the first angle $\phi_1$. See for example, FIGS. 32 and 33. This position enables the widow 22 and other areas of the body structure 16 to be cleaned. With the hinge cover 438 installed and fixed to the hinge base 436, trapping the hanging loop 498 therebetween, the covering panel 20 may be rotated to a window access position (i.e., the second position $P_2$), but the covering panel 20 cannot be removed and will continue to protect the window opening 14 even if left unsecured (unattached to the mounting studs 32).

In this embodiment, to secure the covering panel 20 to the body structure 16, the procedure is similar to the procedure described above and shown in FIGS. 13 and 16-18.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", and "vertical", as well as any other similar directional terms refer to those directions of a vehicle equipped with the vehicle window assembly. Accordingly, these terms, as utilized to describe the present invention should be interpreted relative to a vehicle equipped with the vehicle window assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle window assembly comprising:
    a body structure defining a window opening, and having an upper portion extending along an upper edge of the window opening;
    a covering panel overlaying an inboard side of the window opening, and comprising a hanging loop with a hanging section; and
    a hinge structure comprising a hinge base and a hinge cover, the hinge base including an inboard end and an outboard end, and being attached to the upper portion of the body structure at the inboard end, the hinge cover being configured to attach to the hinge base so as to form a loop support portion between the hinge base and the hinge cover, and so as to enclose an area in which the hanging loop is to be disposed, preventing removal of the hanging loop from the area, the loop support portion being configured to enable the hanging loop to be movable between a secured position in which the hanging section of the hanging loop is positioned adjacent the inboard end of the hinge base, and an unsecured position in which the hanging section of the hanging loop is disposed adjacent the outboard end of the hinge base.

2. The vehicle window assembly according to claim 1, wherein
    the hinge structure includes a first cover mounting portion and a second cover mounting portion, the first cover mounting portion extending transverse to the first cover mounting portion.

3. The vehicle window assembly according to claim 2, wherein
    the second cover mounting portion includes a mounting tab, and the hinge cover includes a mounting tab opening, the mounting tab being configured to fit in the mounting tab opening.

4. The vehicle window assembly according to claim 3, wherein
    the mounting tab extends substantially parallel to the first cover mounting portion.

5. The vehicle window assembly according to claim 2, wherein
    the hinge cover includes a mounting slot configured to receive the second cover mounting portion.

6. The vehicle window assembly according to claim 2, wherein
    the hinge cover includes a mounting slot configured to receive the first cover mounting portion.

7. The vehicle window assembly according to claim 6, wherein
    the mounting slot is a first mounting slot of a plurality of mounting slots and a second mounting slot of the plurality of mounting slots is configured to receive the second cover mounting portion.

8. The vehicle window assembly according to claim 7, wherein
    the second slot is open at a bottom side and an outboard side thereof.

9. The vehicle window assembly according to claim 8, wherein the hinge cover includes a recess portion disposed between first mounting slot and the second mounting slot, and a fastener aperture is disposed in the recessed portion.

10. The vehicle window assembly according to claim 9, further comprising
a fastener configured to be disposed in the fastener aperture and couple the hinge cover to the hinge base, and a head of the fastener being disposed adjacent the outboard side of the second slot.

11. The vehicle window assembly according to claim 7, wherein
the first mounting slot extends in a direction toward the outboard end and the second mounting slot is configured to be disposed at the outboard end and extends in an upwardly direction.

12. The vehicle window assembly according to claim 7, wherein
the second cover mounting portion includes a mounting tab, and the hinge cover includes a mounting opening in communication with the second mounting slot, the mounting tab being configured to fit in the mounting opening.

13. The vehicle window assembly according to claim 2, wherein
the first cover mounting portion extends in a direction toward the outboard end and the second cover mounting portion is disposed at the outboard end and extends in an upwardly direction.

14. The vehicle window assembly according to claim 13, wherein
the first and second cover mounting portions are disposed to form an opening therebetween.

15. The vehicle window assembly according to claim 14, wherein
the first cover mounting portion extends substantially parallel to the loop support portion.

16. The vehicle window assembly according to claim 1, further comprising
a fastener configured to couple the hinge cover to the hinge base.

17. The vehicle window assembly according to claim 16, wherein
the fastener is configured to prevent movement of the hinge cover in a direction toward the outboard end.

18. The vehicle window assembly according to claim 16, wherein
the hinge cover includes a guard portion configured to prevent removal of the fastener.

19. The vehicle window assembly according to claim 1, wherein
the hinge base is a unitary, L-shaped metal bracket.

20. The vehicle window assembly according to claim 1, wherein
the hinge includes a recess portion between the portions of the hinge cover housing the first and second mounting slots.

* * * * *